(12) United States Patent
Jamison et al.

(10) Patent No.: US 11,168,558 B2
(45) Date of Patent: Nov. 9, 2021

(54) ENHANCING OILFIELD OPERATIONS WITH COGNITIVE COMPUTING

(71) Applicant: HALLIBURTON ENERGY SERVICES, INC., Houston, TX (US)

(72) Inventors: Dale E. Jamison, Humble, TX (US); Robert L. Williams, Spring, TX (US); Amir Bar, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 629 days.

(21) Appl. No.: 15/564,167

(22) PCT Filed: May 12, 2015

(86) PCT No.: PCT/US2015/030292
§ 371 (c)(1),
(2) Date: Oct. 3, 2017

(87) PCT Pub. No.: WO2016/182558
PCT Pub. Date: Nov. 17, 2016

(65) Prior Publication Data
US 2018/0119534 A1   May 3, 2018

(51) Int. Cl.
*E21B 44/00* (2006.01)
*G05B 13/04* (2006.01)
(Continued)

(52) U.S. Cl.
CPC ........... *E21B 44/00* (2013.01); *G05B 13/042* (2013.01); *G05B 17/00* (2013.01); *G06N 3/049* (2013.01); *G06N 3/063* (2013.01)

(58) Field of Classification Search
CPC ....... E21B 44/00; G05B 13/042; G05B 17/00; G06N 3/049; G06N 3/063
(Continued)

(56) References Cited

U.S. PATENT DOCUMENTS 6,732,052 B2 * 5/2004 Macdonald ........... E21B 44/005
                                                                 702/6
8,121,971 B2 * 2/2012 Edwards ................ G06N 5/025
                                                                 706/50
(Continued)

FOREIGN PATENT DOCUMENTS

CA      2825189 A      8/2012
EP      1193366 A2     4/2002
WO   2014066981 A1     5/2014

OTHER PUBLICATIONS

Shapiro, Jonathan. "Genetic Algorithms in Machine Learning", ACAI '99, LNAI 2049, pp. 146-168, 2001. (Year: 2001).*
(Continued)

*Primary Examiner* — Kamini S Shah
*Assistant Examiner* — Peter Pham
(74) *Attorney, Agent, or Firm* — Polsinelli PC

(57) ABSTRACT

A cognitive computing system for enhancing oilfield operations, in some embodiments, comprises: neurosynaptic processing logic; and one or more information repositories accessible to the neurosynaptic processing logic, wherein the neurosynaptic processing logic produces a recommendation in response to an oilfield operations indication, the neurosynaptic processing logic produces said recommendation based on a probabilistic analysis of said oilfield operations indication, resources in the one or more information repositories, and oilfield operations models in the one or more information repositories, said oilfield operations models pertaining to oilfield operations associated with said indication, wherein the neurosynaptic processing logic presents said recommendation to a user.

15 Claims, 13 Drawing Sheets

(51) Int. Cl.
  *G05B 17/00* (2006.01)
  *G06N 3/04* (2006.01)
  *G06N 3/063* (2006.01)

(58) Field of Classification Search
  USPC .......................................................... 703/10
  See application file for complete search history.

(56) References Cited

U.S. PATENT DOCUMENTS

| | | | |
|---|---|---|---|
| 2002/0120401 A1 | 8/2002 | Macdonald et al. | |
| 2005/0288819 A1 | 12/2005 | De Guzman | |
| 2008/0162248 A1 | 7/2008 | Vachon et al. | |
| 2011/0098056 A1* | 4/2011 | Rhoads | G06K 9/4671 |
| | | | 455/456.1 |
| 2013/0066445 A1 | 3/2013 | Lei et al. | |
| 2013/0066471 A1* | 3/2013 | Wang | G05B 13/024 |
| | | | 700/275 |
| 2014/0067353 A1 | 3/2014 | Shelley et al. | |
| 2014/0358511 A1* | 12/2014 | Waage | G01V 11/00 |
| | | | 703/10 |
| 2015/0218914 A1* | 8/2015 | Marx | E21B 41/0092 |
| | | | 175/24 |
| 2015/0278407 A1* | 10/2015 | Vennelakanti | E21B 49/003 |
| | | | 703/7 |
| 2015/0300151 A1* | 10/2015 | Mohaghegh | E21B 47/10 |
| | | | 702/9 |

OTHER PUBLICATIONS

U.S, Department of Energy, "Report of the Task Force on Next Generation High Performance Computing", Aug. 18, 2014, 29 pages. (Year: 2014).*
Artificial Brains, "DARPA SyNAPSE Program", Jan. 11, 2013, 10 pages, Accessed at http://www.artificialbrains.com/darpa-synapse-program (Year: 2013).*
Examination Report; Australian Application No. 2015394577; dated Oct. 5, 2018.
artificialbrains.com, "DARPA SyNAPSE Program", Last updated on Jan. 11, 2013; retrieved on Oct. 23, 2018 from https://www.artificialbrains.com/darpa-synapse-program; published on Mar. 16, 2015 as per Wayback Machine.
International Search Report and Written Opinion; PCT Application No. PCT/US2015/030292; dated Feb. 24, 2016.
Secretary of Energy Advisory Board; "Reporting of the Task Force on Next Generation High Performance Computing"; US Department of Energy, Aug. 18, 2014; https://www.energy.gov/seab/downloads/report-task-force-next-generation-high-performance-computing.
Examination Report; Australian Application No. 2015394577; dated Jan. 14, 2019.
Office Action; Canadian Application No. 2,980,874; dated Jul. 12, 2019.
Office Action, Norwegian Application No. 20171576, dated Jan. 16, 2020.
Examination Report; European Application No. 17155599; dated May 18, 2021.

* cited by examiner

ENHANCING OILFIELD OPERATIONS WITH COGNITIVE COMPUTING

CROSS-REFERENCE TO RELATED APPLICATIONS

This application is a national stage entry of PCT/US2015/030292 filed May 12, 2015, said application is expressly incorporated herein in its entirety.

BACKGROUND

Computer scientists and engineers have long tried to create computers that mimic the mammalian brain. Such efforts have met with limited success. While the brain contains a vast, complex and efficient network of neurons that operate in parallel and communicate with each other via dendrites, axons and synapses, virtually all computers to date employ the traditional von Neumann architecture and thus contain some variation of a basic set of components (e.g., a central processing unit, registers, a memory to store data and instructions, external mass storage, and input/output devices). Due at least in part to this relatively simple architecture, von Neumann computers are adept at performing calculations and following specific, deterministic instructions, but—in contrast to the biological brain—they are generally inefficient; they adapt poorly to new, unfamiliar and probabilistic situations; and they are unable to learn, think, and handle data that is vague, noisy, or otherwise imprecise. These shortcomings substantially limit the traditional von Neumann computer's ability to make meaningful contributions in the oil and gas industry.

BRIEF DESCRIPTION OF THE DRAWINGS

Accordingly, there are disclosed in the drawings and in the following description cognitive computing systems and methods that enhance oilfield operations. In the drawings.

Figures 1A, 1B:
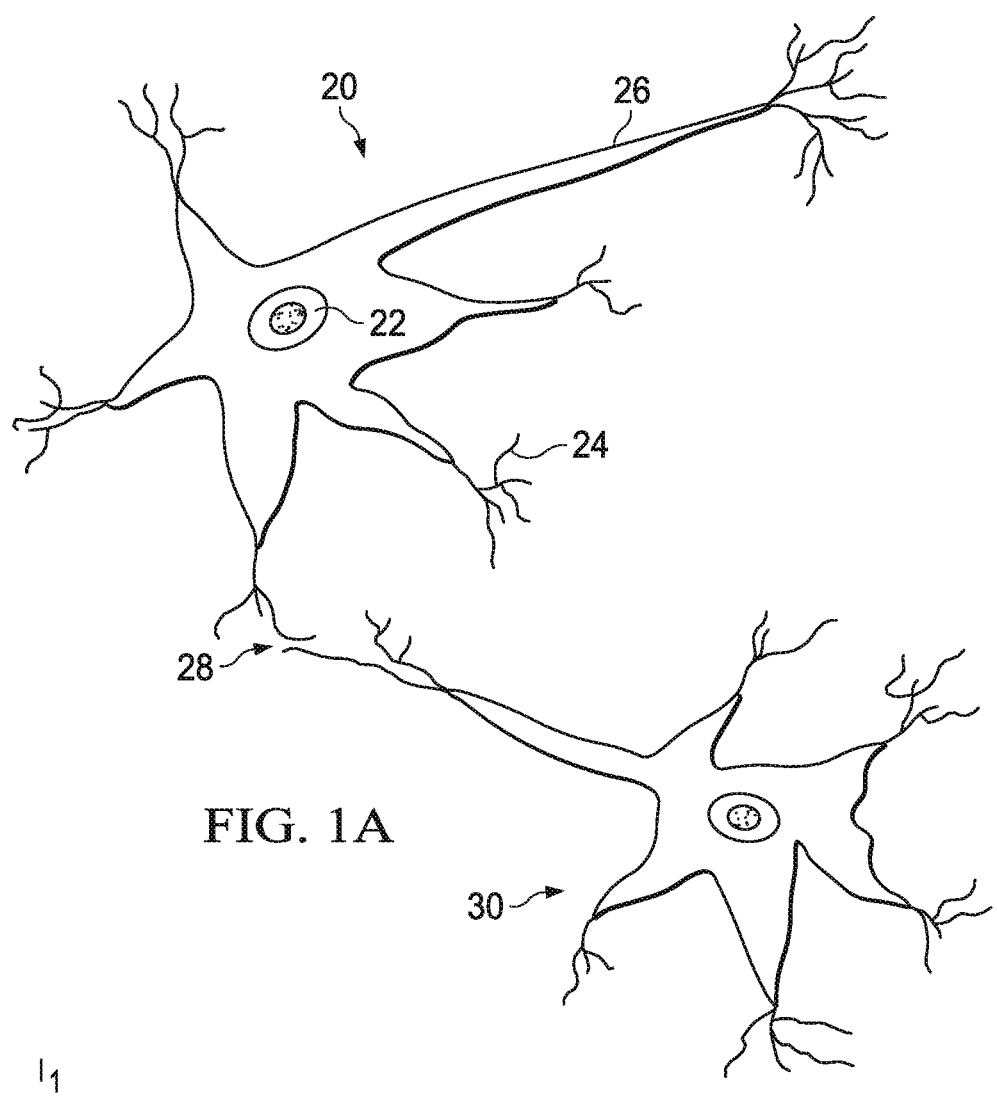
FIG. 1A is an illustration of a pair of biological neurons communicating via a synapse.
FIG. 1B is a mathematical representation of an electronic neuron.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are methods and systems for enhancing oilfield operations using cognitive computers. Cognitive computers—also known by numerous similar terms, including artificial neural networks, neuromorphic and synaptronic systems, and, in this disclosure, neurosynaptic systems—are modeled after the mammalian brain. In contrast to traditional von Neumann architectures, neurosynaptic systems include extensive networks of electronic neurons and cores operating in parallel with each other. These electronic neurons function in a manner similar to that in which biological neurons function, and they couple to electronic dendrites, axons and synapses that function like biological dendrites, axons and synapses. By modeling processing logic after the biological brain in this manner, cognitive computers—unlike von Neumann machines—are able to support complex cognitive algorithms that replicate the numerous advantages of the biological brain, such as adaptability to ambiguous, unpredictable and constantly changing situations and settings; the ability to understand context (e.g., meaning, time, location, tasks, goals); and the ability to learn new concepts.

Key among these advantages is the ability to learn, because learning fundamentally drives the cognitive computer's behavior. In the cognitive computer—just as with biological neural networks—learning (e.g., Hebbian learning) occurs due to changes in the electronic neuron and synapses as a result of prior experiences (e.g., a training session with a human user) or new information. These changes, described below, affect the cognitive computer's future behavior. In a simple example, a cognitive computer robot with no prior experience or software instructions with respect to coffee preparation can be introduced to a kitchen, shown what a bag of ground coffee beans looks like, and shown how to use a coffee machine. After the robot is trained, it will be able to locate materials and make the cup of coffee on its own, without human assistance. Alternatively, the cognitive computer robot may simply be asked to make a cup of coffee without being trained to do so. The computer may access information repositories via a network connection (e.g., the Internet) and learn what a cup is, what ground coffee beans are, what they look like and where they are typically found, and how to use a coffee machine—for example, by means of a YOUTUBE® video. A cognitive computer robot that has learned to make coffee in other settings in the past may engage in a conversation with the user to ask a series of specific questions, such as to inquire about the locations of a mug, ground coffee beans, water, the coffee machine, and whether the user likes sugar and cream with his coffee. If, while preparing the coffee, a wet coffee mug slips from the robot's hand and falls to the floor, the robot may infer that a wet mug is susceptible to slipping and it may grasp a wet mug a different way the next time it brews a cup of coffee.

The marriage between neurosynaptic architecture and cognitive algorithms represents the next step beyond artificial intelligence and can prove especially useful in the oil and gas industry. This disclosure describes the use of neurosynaptic technology (and associated cognitive algorithms) to intelligently assist in optimizing oilfield operations. In particular, when a cognitive computer is presented with a situation regarding any aspect of oilfield operations (e.g., planning, drilling, completion, fracking, cementing, logistics, production), the computer automatically accesses various types of information and uses that information to determine one or more recommendations regarding that aspect or any related aspect of oilfield operations. The cognitive computer additionally provides arguments supporting and opposing each of its recommendations and engages in conversations with human users about the recommendations or any other aspect of the situation. The cognitive computer performs all of these actions intelligently and with minimal or no human assistance using its neurosynaptic architecture and cognitive algorithms.

The oilfield operations situation can be presented to the cognitive computer in various ways. For example, a user may provide information pertaining to the situation directly into the cognitive computer using input devices, such as a keyboard, mouse, touch screen, microphone, camera, or other suitable input device. Alternatively or in addition, a cognitive computer may be present during a meeting of humans and/or other cognitive computers and may automatically and intuitively identify the oilfield operations situation at hand. For instance, during a meeting convened between drilling engineers to discuss placement of a new well, the cognitive computer may collect information (e.g., by listening to the conversation between the engineers and viewing presentation materials displayed on a television screen) and may automatically and without prompting determine, using its cognitive algorithms and prior learning experiences, that a new well is being planned and understand all details pertaining to the potential new well. Other techniques for presenting the oilfield operations situation to the cognitive computer are contemplated. Irrespective of the particular presentation technique used for a particular oilfield operations situation, any and all relevant and seemingly irrelevant details associated with the oilfield operations situation are provided to the cognitive computer.

Once the cognitive computer has been presented with an oilfield operations situation (sometimes referred to herein as an "oilfield operations indication"), the cognitive computer optionally interrogates one or more human users regarding the situation. The interrogation questions are determined at least in part using the computer's probabilistic, cognitive algorithms and prior learning experiences. The computer may engage in an extended conversation with the user(s), asking questions, receiving and processing answers, and asking follow-up questions. The computer also may respond to user questions that ultimately facilitate the computer's collection of relevant knowledge regarding the oilfield operations situation.

The computer then accesses various information—typically stored on local or remote information repositories—that will assist the computer in generating its recommendations. The scope of the disclosure is not limited with respect to the types of information accessed or the source from which they are accessed. In at least some embodiments, however, the accessed information includes oilfield operations models, which are mathematical models used for simulating, explaining and making predictions about complex physical processes and phenomena relating to oilfield operations. The oilfield operations models, which are described in greater detail with respect to FIG. 11, may be proprietary or well-known, deterministic or non-deterministic, and they may be generic or they may apply specifically to the particular oilfield operations situation being analyzed. The cognitive computer accesses such models and uses the models to generate multiple "scenarios" pertaining to the oilfield operations situation. In at least some embodiments, the cognitive computer generates all possible scenarios pertaining to the oilfield operations situation by using each possible permutation of input parameters for each model. Each scenario is a different permutation of the oilfield operations models as applied to the oilfield operations situation. For example, in one scenario, the parameters associated with an oilfield operations model may be set to one array of values, and in another scenario, a single one of those parameter values may be adjusted. Accordingly, a set of such scenarios for a single oilfield operations situation may number in the thousands, hundreds of thousands or more. The cognitive computer uses these modeled scenarios to identify how the outcomes of the models change when different parameters are modified. Because the cognitive computer analyzes the modeled scenarios in great detail in this manner, it detects relationships between various model parameters (e.g., well placement, well trajectory, weight on bit) and ultimate outcomes that human users and even von Neumann computers may not be able to detect. In this way, the cognitive computer learns the nuances of the oilfield operations situation.

After having received information regarding the oilfield operations situation, interrogated the user(s) to obtain additional information, and generated multiple scenarios, the cognitive computer accesses resources from information repositories to better inform the recommendations that it generates. Information repositories may vary substantially in scope and may include, without limitation, other cognitive computing systems; distributed and non-distributed databases; sources that provide real-time data pertaining to oil and gas operations; servers; personal computers; portable hard drives; thumb drives; mobile phones; smart phones; websites; or any resource available via the Internet, World Wide Web, or a local network connection. The resources accessed from such information repositories may include information that is in "natural" language, meaning, for instance, everyday language used by humans to communicate with each other that is not specifically formatted to be read by traditional von Neumann machines. Non-limiting examples of such resources include real-time data specific to the oilfield operations; journals; articles; books; white papers; reports; speech; web content, etc. The cognitive computer locates and collects any and all such information that could pertain to the oilfield operations situation.

Having collected all potentially useful information pertaining to the oilfield operations situation and having generated the multiple scenarios to learn the behavior of the oilfield operations situation being analyzed, the cognitive computer uses its probabilistic, cognitive algorithms and prior learned behavior (e.g., training by human users) to generate one or more recommendations regarding the oilfield operations situation. The cognitive computer presents the recommendation(s) to a user or another entity (e.g., another cognitive computer or a traditional von Neumann machine) via an output interface. If multiple recommendations are presented, the cognitive computer may rank the recommendations based on a ranking algorithm. The ranking algorithm may have been programmed directly into the computer, or the computer may have been trained to use the algorithm, or some combination thereof. The cognitive computer may have automatically modified its ranking algorithm based on past user recommendation selections and subsequent outcomes so that the recommendation most likely to be selected by the user is ranked highest and is most likely to produce the best outcome for the user.

In addition, the cognitive computer—without human assistance—produces arguments highlighting the advantages and disadvantages associated with each recommendation presented. These arguments are produced using the cognitive, probabilistic algorithms with which the cognitive computer is programmed or trained and using information the computer has learned in the past (e.g., facts obtained from information repositories or prior experiences). The computer may also engage in conversations with a user or other entity about the recommendations, the arguments pertaining to the recommendations, or the oilfield operations situation in general. The computer may answer the user's questions, and, in some embodiments, the computer may ask the user its own questions to further refine the list of possible recommendations and rankings. For instance, when planning the location of a new well in an established field, the user may challenge the cognitive computer's recommendation by explaining that another well in that field has historically underperformed. The cognitive computer may rebut the user's argument with facts gleaned from any available information repository, having been trained to engage in such fact-based conversations in the past. The computer may, for example, explain that although the other well in the field has historically underperformed, the formation abutting that well was sub-optimally fractured. Based on the user's responses, the cognitive computer may learn for future use the types of facts and arguments the user finds most persuasive.

If the user approves the recommendation (or, in the case of multiple recommendations, selects one or more of the recommendations), the cognitive computer executes the recommendation(s), observes the consequences of that selection, and modifies any accessible information repositories to reflect those consequences, thereby improving the accuracy and reliability of the data in the repositories. If the user finds the recommendation(s) unsatisfactory, the user may instruct the cognitive computer to propose a different recommendation, and the process is repeated. The foregoing description is merely illustrative of one non-limiting, potential application of cognitive computing in the oilfield operations context.

FIG. 1A is an illustration of a pair of biological neurons communicating via a synapse. Specifically, neuron 20 includes a nucleus 22, dendrites 24, an axon 26 and a synapse 28 by which it communicates with another neuron 30. The dendrites 24 serves as inputs to the neuron 20, while the axon 26 serves as an output from the neuron 20. The synapse 28 is the space between an axon of neuron 30 and a dendrite 24 of neuron 20, and it enables the neuron 30 to output information to the neuron 20 using neurotransmitters (e.g., dopamine, norepinephrine). The neuron 20 receives input from numerous neurons (not specifically shown) in addition to the neuron 30. Each of these inputs impacts the neuron 20 in different ways. Some of these neurons provide excitatory signals to the neuron 20, while other neurons provide inhibitory signals to the neuron 20. Excitatory signals push the membrane potential (i.e., the voltage difference between the neuron and the space surrounding the neuron, typically about −70 mV) toward a threshold value which, if exceeded, results in an action potential (or "spiking," which is the transmission of a pulse) of the neuron 20, and inhibitory signals pull the membrane potential of the neuron 20 away from this threshold. The repeated excitation or inhibition the neuron 20 through these different input pathways results in learning. Stated another way, if a particular input to a neuron repeatedly and persistently causes that neuron to fire, a metabolic change occurs in the synapse associated with that input axon to reduce the resistance in the synapse. This phenomenon is known as the Hebbian learning rule. In a more specific version of Hebbian learning, called spike-timing-dependent plasticity (STDP), repeated presynaptic spike arrival a few milliseconds before postsynaptic action potentials leads to long-term potentiation of that synapse, whereas repeated presynaptic spike arrival a few milliseconds after post-synaptic action potentials leads to long-term depression of the same synapse. STDP is thus a form of neuroplasticity, in which synaptic changes occur due to changes in behavior, environment, neural processes, thinking, and emotions.

FIG. 1B is a mathematical representation of an electronic neuron 50 that mimics the behavior of a biological neuron. Specifically, the electronic neuron 50 includes a nucleus 52 that has multiple inputs $I_1, I_2, \ldots, I_N$, and these inputs are associated with weights $W_1, W_2, \ldots, W_N$, respectively. The weight associated with an input dictates the impact that that input will have upon the neuron 50 and, more specifically, on the electronic neuron's mathematical equivalent of a biological membrane potential (which, for purposes of this discussion, will still be referred to as a membrane potential). The summation of the weighted inputs produces a membrane potential x, which causes a spike 56 if the potential x exceeds a threshold value T (numeral 54). Similar to Hebbian learning, repeated and persistent signals from a particular input to the electronic neuron 50 that causes the neuron to spike results in a shift in the magnitudes of weights $W_1, W_2, \ldots W_N$ to increase the weight associated with that particular input.

Figure 1C:
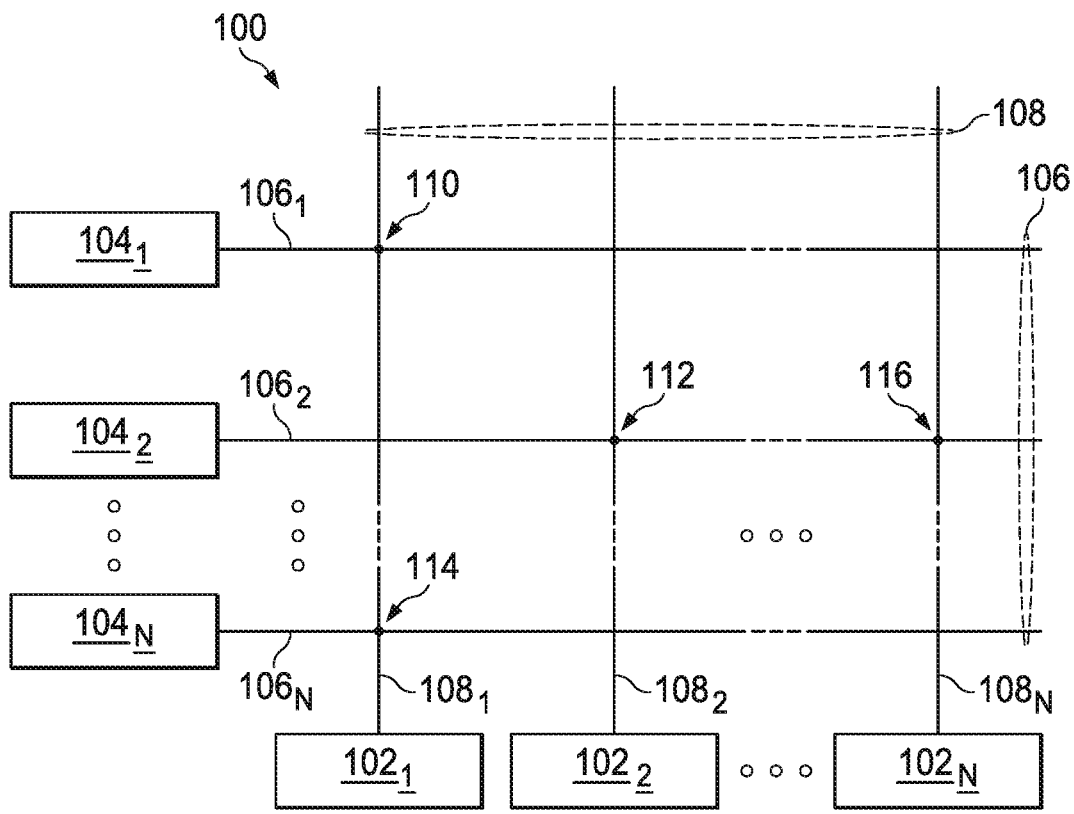
FIG. 1C is a schematic diagram of a neurosynaptic tile for use in a cognitive computer.

FIG. 1C is a schematic diagram of a neurosynaptic tile 100 for use in a cognitive computer. The neurosynaptic tile 100 includes a plurality of electronic neurons $102_1, 102_2, \ldots, 102_N$. The tile 100 further includes a plurality of electronic neurons $104_1, 104_2, \ldots, 104_N$. Each of the neurons $104_1, 104_2, \ldots, 104_N$ couples to an axon $106_1, 106_2, \ldots, 106_N$ (generally indicated by numeral 106), respectively. Similarly, each of the neurons $102_1, 102_2, \ldots, 102_N$ couples to a dendrite $108_1, 108_2, \ldots, 108_N$ (generally indicated by numeral 108), respectively. The axons 106 and dendrites 108 couple to each other in predetermined locations. For example, axon $106_1$ couples to dendrite $108_1$ at an electronic synapse 110; axon $106_2$ couples to dendrites $108_2, 108_N$ at synapses 112, 116, respectively; and axon $106_N$ couples to dendrite $108_1$ at synapse 114. In operation, when any of the membrane potentials of the electronic neurons $104_1, 104_2, \ldots, 104_N$ reaches or exceeds a threshold value, that neuron(s) fires on the corresponding axon(s) 106. The dendrites 108 to which the firing axons 106 couple receive the spikes and provide them to the neurons $102_1, 102_2, \ldots, 102_N$.

As explained above with respect to FIG. 1B, an electronic neuron may ascribe different weights to each input provided to that neuron. The same is true for the electronic neurons $102_1, 102_2, \ldots, 102_N$ and $104_1, 104_2, \ldots, 104_N$. Thus, for example, the dendrite $108_1$, which corresponds to electronic neuron $102_1$, couples to axons $106_1, 106_N$ at synapses 110, 114, respectively, and the electronic neuron $102_1$ ascribes different weights to the inputs from dendrites $106_1$ and $106_N$. If a greater weight is ascribed to dendrite $106_1$, the excitatory or inhibitory signal provided by that dendrite receives greater consideration toward the calculation of the membrane potential of the neuron $102_1$. Similarly, if a greater weight is ascribed to dendrite $106_N$, the excitatory or inhibitory signal provided by that dendrite receives greater consideration toward the calculation of the membrane potential of the neuron $102_1$. If the summation of the weighted signals received from the dendrites $106_1$ and $106_N$ exceeds the threshold of the neuron $102_1$, the neuron $102_1$ spikes on its axon (not specifically shown). In this way—by strengthening some electronic synapses and weakening others through the adjustment of input weights—these neurons implement an electronic version of STDP.

Figure 1D:
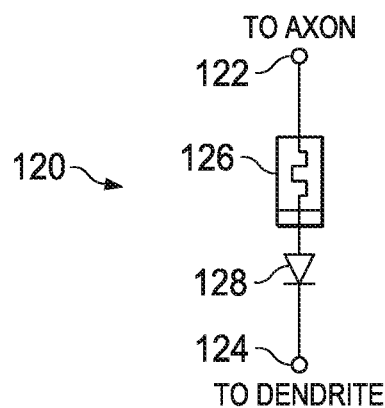
FIG. 1D is a schematic diagram of a circuit that embodies an electronic synapse.

FIG. 1D is a schematic diagram of a circuit that embodies an electronic synapse, such as the electronic synapses 110, 112, 114, 116 shown in FIG. 1C. Specifically, the electronic synapse 120 in FIG. 1D includes a node 122 that couples to an axon, a node 124 that couples to a dendrite, and a memristor 126 to store data. An optional access or control device 128 (e.g., a PN diode or field effect transistor (FET) wired as a diode, or some other element with a non-linear voltage-current response) may be coupled in series with the memristor 126 to prevent cross-talk during communication of neuronal spikes on adjacent axons or dendrites and to minimize leakage and power consumption. In some embodiments, a different memory element (e.g., static random access memory (SRAM), dynamic random access memory (DRAM), enhanced dynamic random access memory (EDRAM)) is used in lieu of the memristor 126.

Figure 1E:
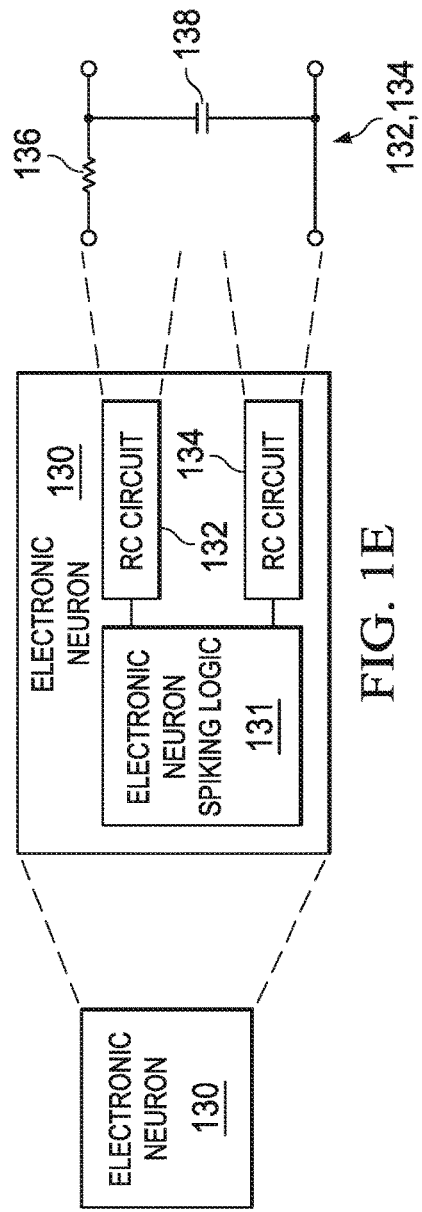
FIG. 1E is a schematic diagram of an electronic neuron.

FIG. 1E is a schematic diagram of an electronic neuron 130. Specifically, an electronic neuron 130 comprises electronic neuron spiking logic 131 and multiple resistor-capacitor (RC) circuits 132, 134. Although only two RC circuits are shown in the electronic neuron 130 of FIG. 1E, any suitable number of RC circuits may be used. Each RC circuit includes a resistor 136 and a capacitor 138 coupled as shown. When an electronic neuron fires (i.e., issues a spike) as a result of its membrane potential exceeding the neuron's firing threshold, the neuron maintains pre-synaptic and post-synaptic STDP variables. Each of these variables is a signal that decays with a relatively long time constant that is determined based on the values of the capacitor in a different one of the RCs 132, 134. Each of these signals may be sampled by determining the voltage across a corresponding RC circuit capacitor using, e.g., a current mirror. By sampling each of the variables, the length of time between the arrival of a pre-synaptic spike and a post-synaptic action potential following the spike arrival can be determined, as can the length of time between a post-synaptic action potential and a pre-synaptic spike arrival following the action potential. As explained above, the lengths of these times are used in STDP—that is, to effect synaptic potentiation and depression by adjusting synaptic weights, and thus to facilitate neurosynaptic learning.

Figure 1F:
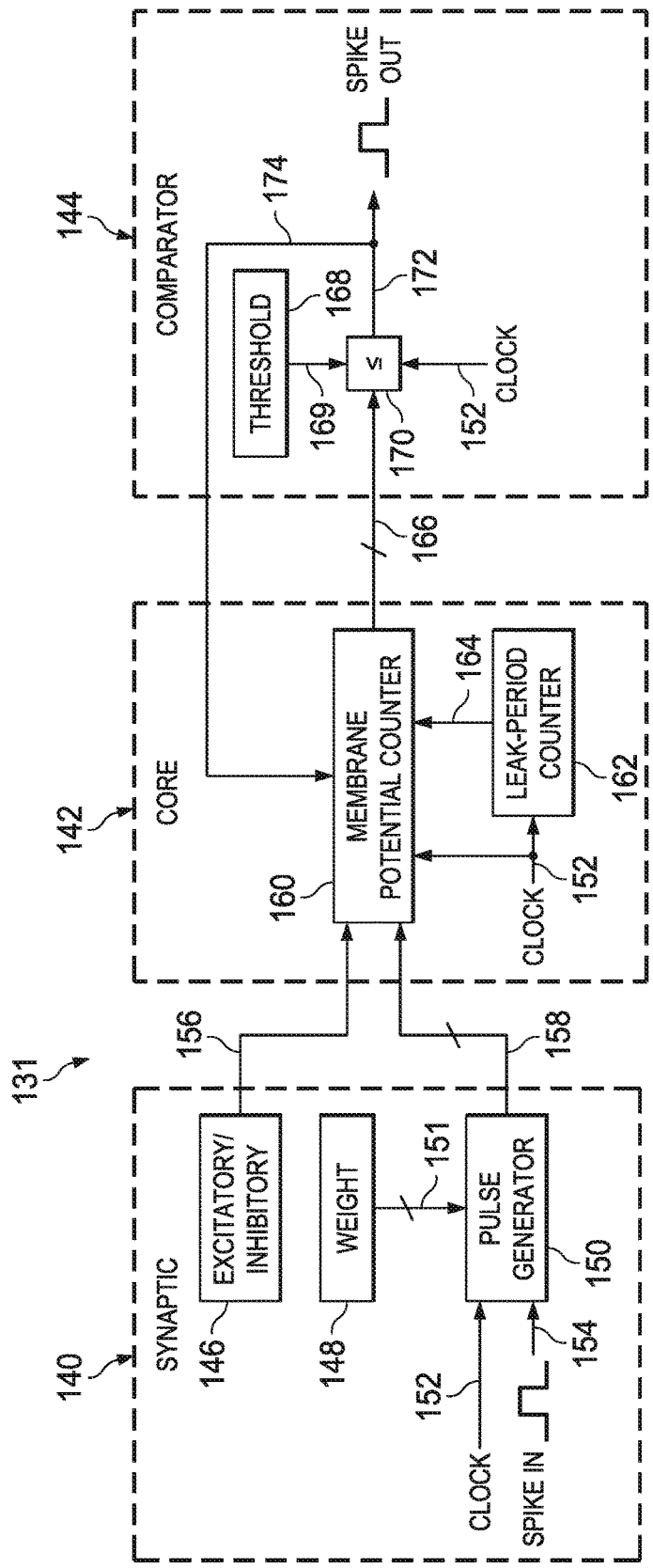
FIG. 1F is a block diagram of an electronic neuron spiking logic.

FIG. 1F is a block diagram of the electronic neuron spiking logic 131 of FIG. 1E. The logic 131 includes three conceptual components: a synaptic component 140, a neuronal core component 142, and a comparator component 144. Although FIG. 1F shows only one synaptic component 140, in practice, a separate synaptic component 140 is used for each synapse from which the electronic neuron receives input. Thus, in some embodiments the electronic neuron contains multiple synaptic components 140, one for each synapse from which that neuron receives input. In other embodiments, the synaptic component 140 forms a part of the synapse itself and not the electronic neuron. In either type of embodiment, the end result is the same.

Each synaptic component 140 includes an excitatory/inhibitory signal generator 146, a weight signal generator 148 associated with the corresponding synapse, and a pulse generator 150. The pulse generator 150 receives a clock signal 152 and a spike input signal 154, as well as a weight signal 151 from the weight signal generator 148. The pulse generator 150 uses its inputs to generate a weighted spike signal 158—for instance, the spike input signal 154 multiplied by the weight signal 151. The width of the weighted spike signal pulse reflects the magnitude of the weighted signal, and thus the magnitude that will contribute to or take away from the membrane potential of the electronic neuron. The weighted signal for the synapse corresponding to the synaptic component 140 is provided to the core component 142, and similar weighted signals are provided from synaptic components 140 corresponding to other synapses from which the electronic neuron receives input. For each weighted signal that the core 142 receives from a synaptic component 140, the core 142 also receives a signal 156 from the excitatory/inhibitory signal generator 146 indicating whether the weighted signal 158 is an excitatory (positive) or inhibitory (negative) signal. An excitatory signal pushes the membrane potential of the electronic neuron toward its action potential threshold, while an inhibitory signal pulls the membrane potential away from the threshold. As explained, the neurosynaptic learning process involves the adjustment of synaptic weights. Such weights can be adjusted by modifying the weight signal generator 148.

The core component 142 includes a membrane potential counter 160 and a leak-period counter 162. The membrane potential counter receives the weighted signal 158 and the excitatory/inhibitory signal 156, as well as the clock 152 and a leak signal 164 from the leak-period counter 162. The leak-period counter 162, in turn, receives only clock 152 as an input. In operation, the membrane potential counter 160 maintains a counter—initially set to zero—that is incremented when excitatory, weighted signals 158 are received from the synaptic component 140 and that is decremented when inhibitory, weighted signals 158 are received from the synaptic component 140. When no synapse pulse is applied to the core component 142, the leak period counter signal 164 causes the membrane potential counter 160 to gradually decrement at a predetermined, suitable rate. This action mimics the leak experienced in biological neurons during a period in which no excitatory or inhibitory signals are received by the neuron. The membrane potential counter 160 outputs a membrane potential signal 166 that reflects the present value of the counter 160. This membrane potential signal 166 is provided to the comparator component 144.

The comparator component 144 includes a threshold signal generator 168 and a comparator 170. The threshold generator 168 generates a threshold signal 169, which reflects the threshold at which the electronic neuron 130 generates a spike signal. The comparator 170 receives this threshold signal 169, along with the membrane potential signal 166 and the clock 152. If the membrane potential signal 166 reflects a counter value that is equal to or greater than the threshold signal 169, the comparator 170 generates a spike signal 172, which is subsequently output via an axon of the electronic neuron. As numeral 174 indicates, the spike signal is also provided to the membrane potential counter 160, which, upon receiving the spike signal, resets itself to zero.

Figure 2:
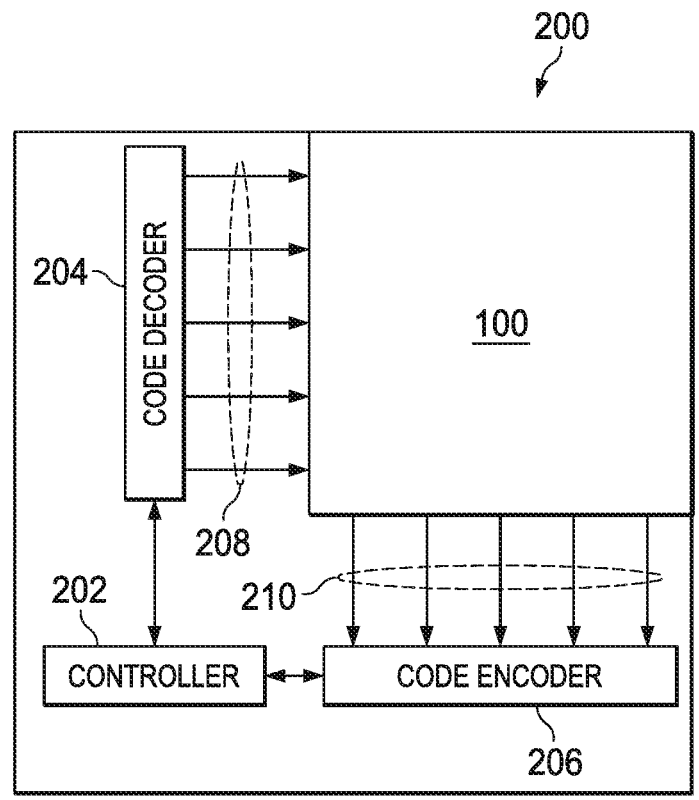
FIG. 2 is a schematic diagram of a neurosynaptic core for use in a cognitive computer.

FIG. 2 is a schematic diagram of a neurosynaptic core 200 for use in a cognitive computer. The core 200 includes a neurosynaptic tile 100, a controller 202, a decoder 204, an encoder 206, inputs 208, and outputs 210. Spike events generated by electronic neurons generally take the form of data packets. These packets, which may be received from neurons on other cores external to the core 200, are decoded by the decoder 204 (e.g., to interpret and remove packet headers) and passed as inputs 208 to the neurosynaptic tile 100. Similarly, packets generated by neurons within the neurosynaptic tile 100 that are destined for neurons outside the core 200 are passed as outputs 210 to the encoder 206 for encoding (e.g., to include a header with a destination address). The controller 202 controls the decoder 204 and encoder 206.

Figure 3:
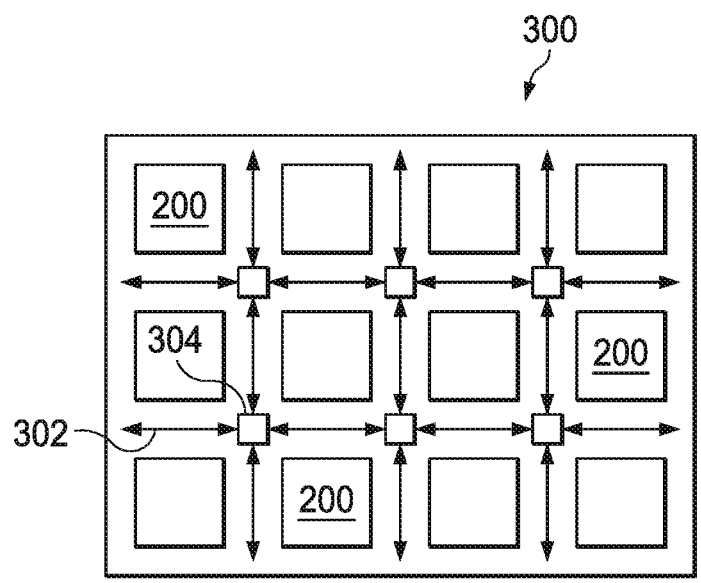
FIG. 3 is a schematic diagram of a multi-core neurosynaptic chip for use in a cognitive computer.

FIG. 3 is a schematic diagram of a multi-core neurosynaptic chip 300 for use in a cognitive computer. The chip 300 includes a plurality of neurosynaptic cores 200, such as the core 200 described with respect to FIG. 2. The cores 200 couple to each other via electrical connections (e.g., conductive traces). The chip 300 may include any suitable number of cores—for example, 4,096 or more cores on a single chip, with each core containing millions of electronic synapses. The chip 300 also contains a plurality of intrachip spike routers 304 that couple to a routing fabric 302. The cores 200 communicate with each other via the routers 304 and the fabric 302, using the aforementioned encapsulated, encoded packets to facilitate routing between cores and specific neurons within the cores.

Figure 4:
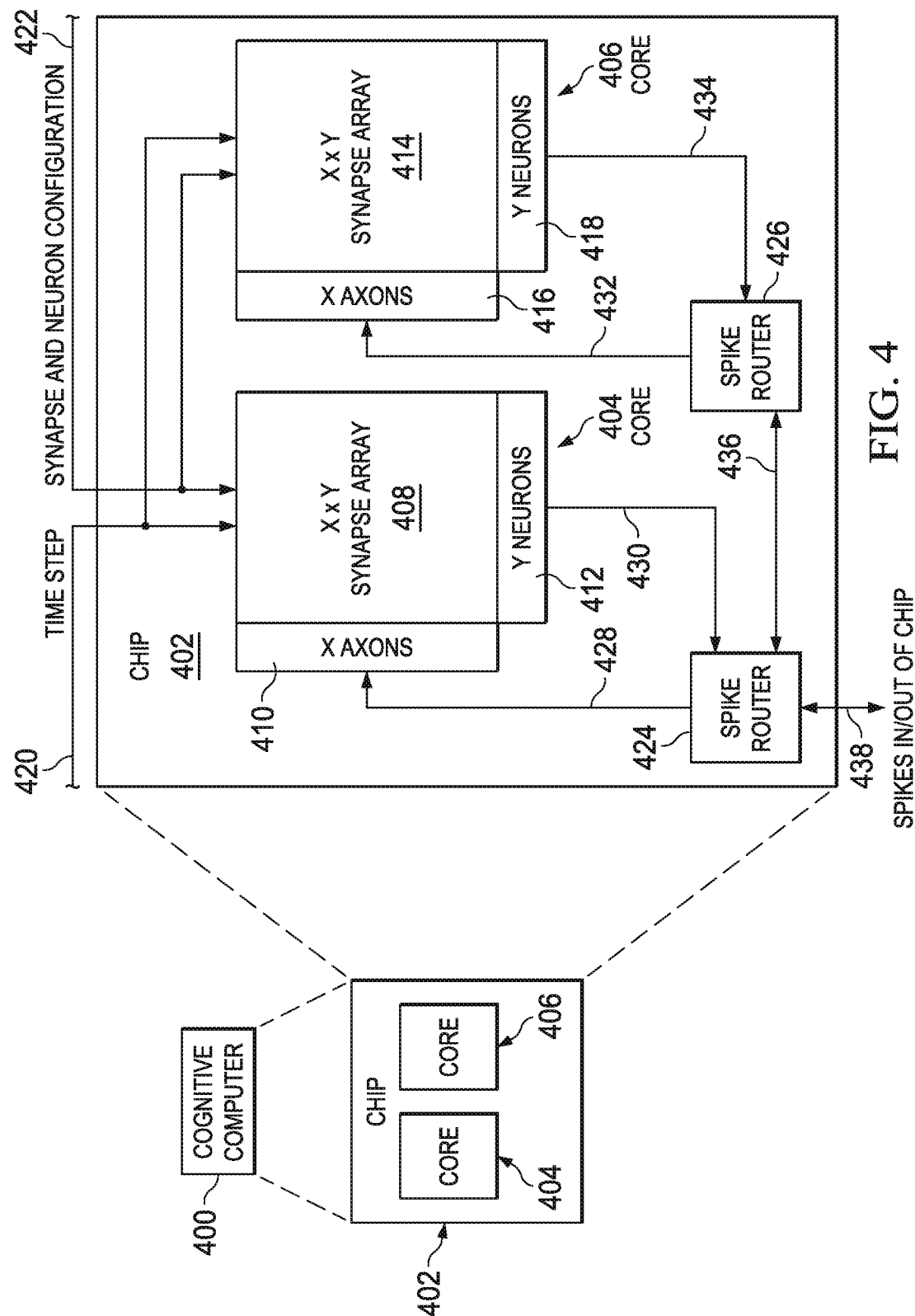
FIG. 4 is a detailed schematic diagram of a dual-core neurosynaptic chip for use in a cognitive computer.

FIG. 4 is a detailed schematic diagram of a dual-core neurosynaptic chip 402 for use in a cognitive computer 400. Specifically, a cognitive computer may include any suitable number of neurosynaptic chips 402, and each of these neurosynaptic chips 402 may include any suitable number of neurosynaptic cores, as previously explained. In the example of FIG. 4, the neurosynaptic chip 402 is a dual-core chip containing neurosynaptic cores 404, 406. The core 404 includes a synapse array 408 that includes a plurality of synapses that couple various axons 410 to dendrites. In some embodiments, axons 410 receive spikes from neurons directly coupled to the axons 410 and included on the core 404 (not specifically shown in FIG. 4, but an illustrative embodiment is shown in FIG. 1). In other embodiments, axons 410 are extensions of neurons located off of the core 404 (e.g., elsewhere on the chip 402, or on a different chip). In embodiments where the axons 410 couple directly to on-core neurons (e.g., as shown in FIG. 1), the spike router 424 provides spikes directly to the neurons' dendrites. In embodiments where the axons 410 are extensions of off-core neurons, the spike router 424 provides spikes from those neurons to the axons 410. Although a multitude of variations of such embodiments are possible, for brevity, FIG. 4 shows only an array of axons 410.

The synapse array 408 also couples to neurons 412. The neurons 412 may be a single-row, multiple-column array of neurons, or, alternatively, the neurons 412 may be a multiple-row-, multiple-column array of neurons. In either case, dendrites of the neurons 412 couple to axons 410 in the synapse array 408, thus facilitating the transfer of spikes from the axons 410 to the neurons 412 via dendrites in the synapse array 408. The spike router 424 receives spikes from off-core sources, such as the core 406 or off-chip neurons. The spike router 424 uses spike packet headers to route the spikes to the appropriate neurons 412 (or, in some embodiments, on-core neurons directly coupled to axons 410). In either case, bus 428 provides data communication between the spike router 424 and the core 404. Similarly, neurons 412 output spikes on their axons and bus 430 provides the spikes to the spike router 424. The core 406 is similar or identical to the core 404. Specifically, the core 406 contains axons 416, neurons 418, and a synapse array 414. The axons 416 couple to a spike router 426 via bus 432, and neurons 418 couple to the spike router 426 via bus 434. The functionality of the core 406 is similar or identical to that of the core 404 and thus is not described. A bus 436 couples the spike routers 424, 426 to facilitate spike routing between the cores 404, 406. A bus 438 facilitates the communication of spikes on and off of the chip 402. The architectures shown in FIGS. 1-4 (e.g., the TRUENORTH® architecture by IBM®) are non-limiting; other architectural configurations are contemplated and included within the scope of the disclosure.

Various types of software may be written for use in cognitive computers. One programming methodology is described below, but the scope of disclosure is not limited to this particular methodology. Any suitable, known software architecture for programming neurosynaptic processing logic is contemplated and intended to fall within the scope of the disclosure. The software architecture described herein entails the creation and use of programs that are complete specifications of networks of neurosynaptic cores, along with their external inputs and outputs. As the number of cores grows, creating a program that completely specifies the network of electronic neurons, axons, dendrites, synapses, spike routers, buses, etc. becomes increasingly difficult. Accordingly, a modular approach may be used, in which a network of cores and/or neurons encapsulates multiple sub-networks of cores and/or neurons; each of the sub-networks encapsulates additional sub-networks of cores and/or neurons, and so forth. In some embodiments, the CORELET® programming language, library and development environment by IBM® may be used to develop such modular programs.

Figure 5:
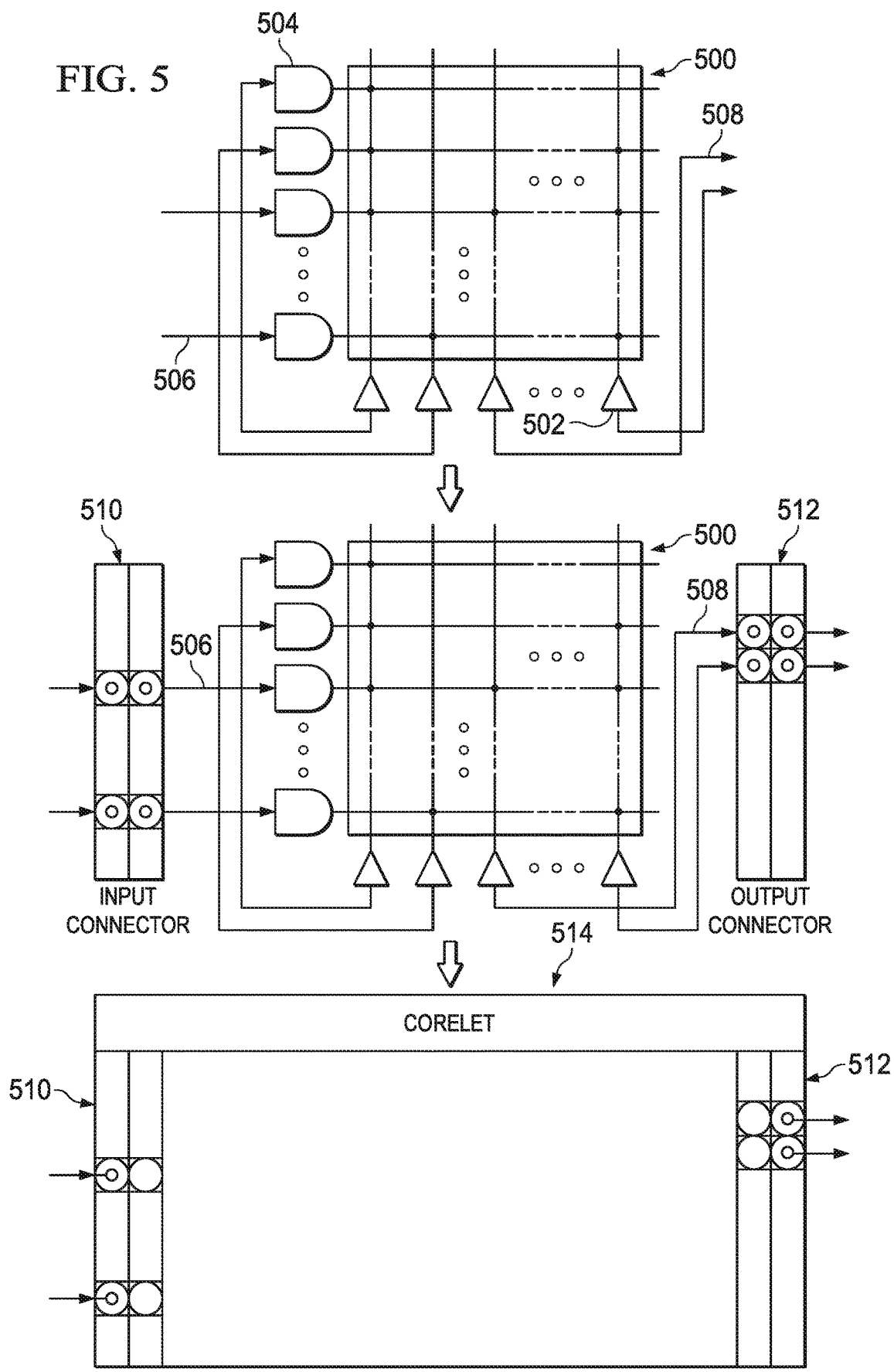
FIGS. 5 and 6 are conceptual diagrams of scalable corelets used for programming neurosynaptic processing logic.
Figure 6:
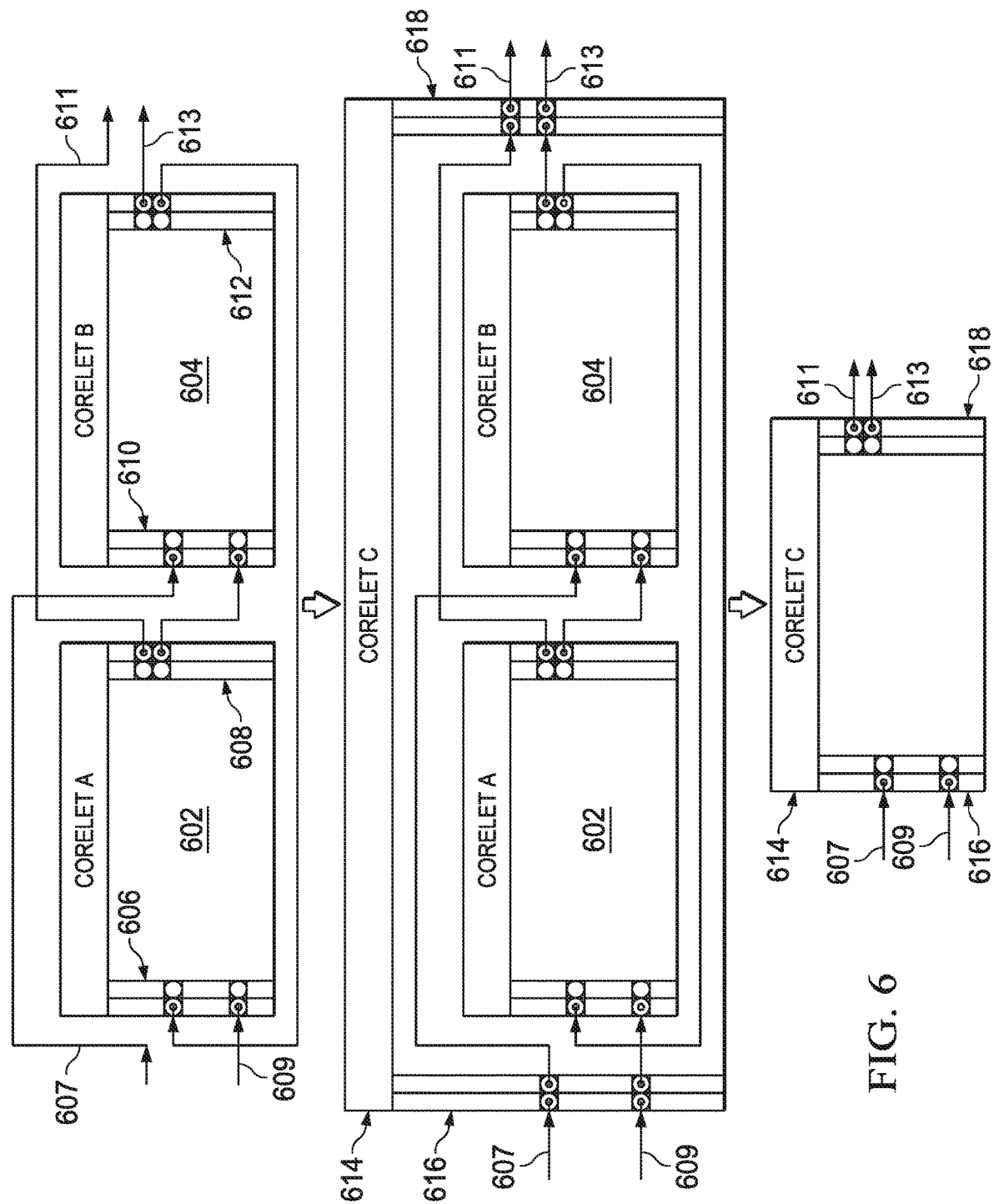

FIGS. 5 and 6 are conceptual diagrams illustrating the modular nature of the CORELET® programming architecture. FIG. 5 contains three panels. The first panel illustrates a neurosynaptic tile 500 containing a plurality of neurons 502 and axons 504, similar to the neurosynaptic architecture shown in FIG. 4. As shown, some of the neurons' outputs couple to the axons' inputs. However, inputs to other axons 504 are received from outside the tile 500, as numeral 506 indicates. Similarly, outputs from other neurons 502 are provided outside of the tile 500, as numeral 508 indicates. The second panel in FIG. 5 illustrates the initial step in the encapsulation of a tile into a corelet—that is, an abstraction that represents a program (for a neurosynaptic processing logic) that only exposes external inputs and outputs while encapsulating all other details into a "black box." Thus, as shown in the second panel, the only inputs to the tile 500 are inputs 506 to some of the axons 504, and the only outputs from the tile 500 are outputs 508 from some of the neurons 502. The inputs 506 couple to an input connector 510, and the outputs couple to an output connector 512. The third panel in FIG. 5 shows the completed corelet 514, with only the input connector 510 and output connector 512 being exposed, and with the remainder of the tile 500 having been encapsulated into the corelet 514. The completed corelet 514 constitutes a single building block of the CORELET® modular architecture; the corelet 514 may be grouped with one or more other corelets to form a larger corelet; in turn, that larger corelet may be grouped with one or more other larger corelets to form an even larger corelet, and so forth.

FIG. 6 includes three panels illustrating such encapsulation of multiple sub-corelets into a larger corelet. Specifically, the first panel includes corelets 602 and 604. Corelet 602 includes an input connector 606 and output connector 608. The remainder of the contents of the corelet 602 do not couple to circuitry outside of the corelet 602 and thus are not specifically shown as being coupled to the input connector 606 or the output connector 608. Similarly, corelet 604 includes an input connector 610 and an output connector 612. Certain inputs to and outputs from the corelets 602, 604 couple to each other, while other such inputs and outputs do not (i.e., inputs 607, 609 are not received from either corelet 602, 604, and outputs 611, 613 are not provided to either corelet 602 or 604). Thus, as shown in the second and third panels of FIG. 6, when the corelets 602, 604 are grouped into a single, larger corelet 614, only inputs 607, 609 are exposed on the input connector 616, and only outputs 611, 613 are exposed on the output connector 618. The remaining contents of the corelet 614 are encapsulated. As explained, one purpose of encapsulating neurosynaptic processing logic into corelets and sub-corelets is to organize the processing logic in a modular way that facilitates the creation of CORELET® programs, since such programs are complete specifications of networks of neurosynaptic cores. Although FIGS. 5 and 6 demonstrate the modular nature of the CORELET® software architecture, the CORELET® syntax itself is known and is not described here. Cognitive computing software systems other than CORELET® also may be used in conjunction with the hardware described herein or with any other suitable cognitive computing hardware. All such variations and combinations of potentially applicable cognitive computing hardware and software are contemplated and may be used to implement the oilfield operations enhancement techniques described herein.

The remainder of this disclosure describes the use of hardware and software cognitive computing technology to facilitate the enhancement of oilfield operations. As explained above, any suitable cognitive computing hardware or software technology may be used to implement such techniques. This cognitive computing technology may include none, some or all of the hardware and software architectures described above. For example, the oilfield operations enhancement techniques described below may be implemented using the CORELET® programming language or any other software language used in conjunctive with cognitive computers. The foregoing architectural descriptions, however, are non-limiting. Other hardware and software architectures may be used in lieu of, or to complement, any of the foregoing technologies. Any and all such variations are included within the scope of the disclosure.

Figure 7:
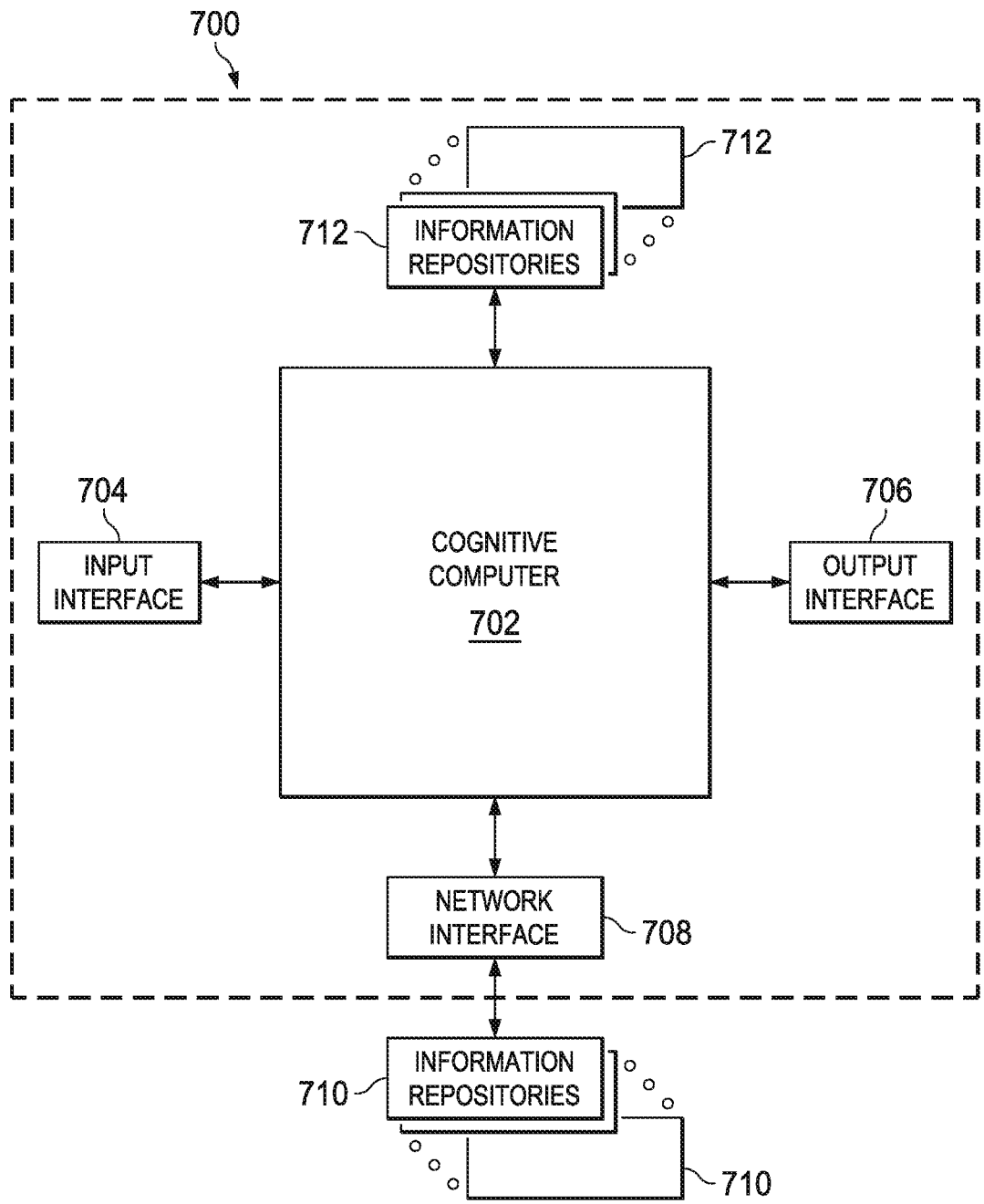
FIG. 7 is a block diagram of a cognitive computing system that has access to multiple information repositories.

FIG. 7 is a block diagram of a cognitive computing system 700 that has access to multiple information repositories. Specifically, the cognitive computing system 700 includes a cognitive computer 702 (i.e., any suitable computer that includes neurosynaptic processing logic and cognitive algorithm-based software, such as those described above) coupled to an input interface 704, an output interface 706, a network interface 708 and one or more local information repositories 712. In at least some embodiments, the input interface 704 is any suitable input device(s), such as a keyboard, mouse, touch screen, microphone, video camera, or one or more wearable devices (e.g., augmented reality device such as GOOGLE GLASS®. Other input devices are contemplated. The output interface 706 may include one or more of a display and an audio output device. Other output devices are contemplated. The network interface 708 is, for example, a network adapter or other suitable interface logic that enables communication between the cognitive computer 702 and any device not directly coupled to the cognitive computer 702. The local information repositories 712 include, without limitation, thumb drives, compact discs, Bluetooth devices, and any other device that can couple directly to the cognitive computer 702 such as by universal serial bus (USB) cable or high definition multimedia interface (HDMI) cable.

The cognitive computer 702 communicates with any number of remote information repositories 710 via the network interface 708. The quantity and types of such information repositories 710 may vary widely, and may include, without limitation, other cognitive computers; databases; distributed databases; sources that provide real-time data pertaining to oil and gas operations, such as drilling, fracturing, cementing, or seismic operations; servers; other personal computers; mobile phones and smart phones; websites and generally any resource(s) available via the Internet, World Wide Web, or a local network connection such as a virtual private network (VPN); cloud-based storage; libraries; and company-specific, proprietary, or confidential data. Any other suitable source of information with which the cognitive computer 702 can communicate is included within the scope of disclosure as a potential information repository 710. The cognitive computer 702—which, as described above, has the ability to learn, process imprecise or vague information, and adapt to unfamiliar environments—is able to receive an oilfield operations indication (e.g., via one or more input interfaces 704) and intelligently determine one or more recommendations based on the oilfield operations indication and associated information; prior learned knowledge and training; scenarios generated using oilfield operations models; and resources accessed from information repositories. The software stored on the cognitive computer 702 is probabilistic (i.e., non-deterministic) in nature, meaning that its behavior is guided by probabilistic determinations regarding the various possible outcomes of each oilfield operations model scenario and each recommendation available in a given oilfield operations indication.

Figure 8A:
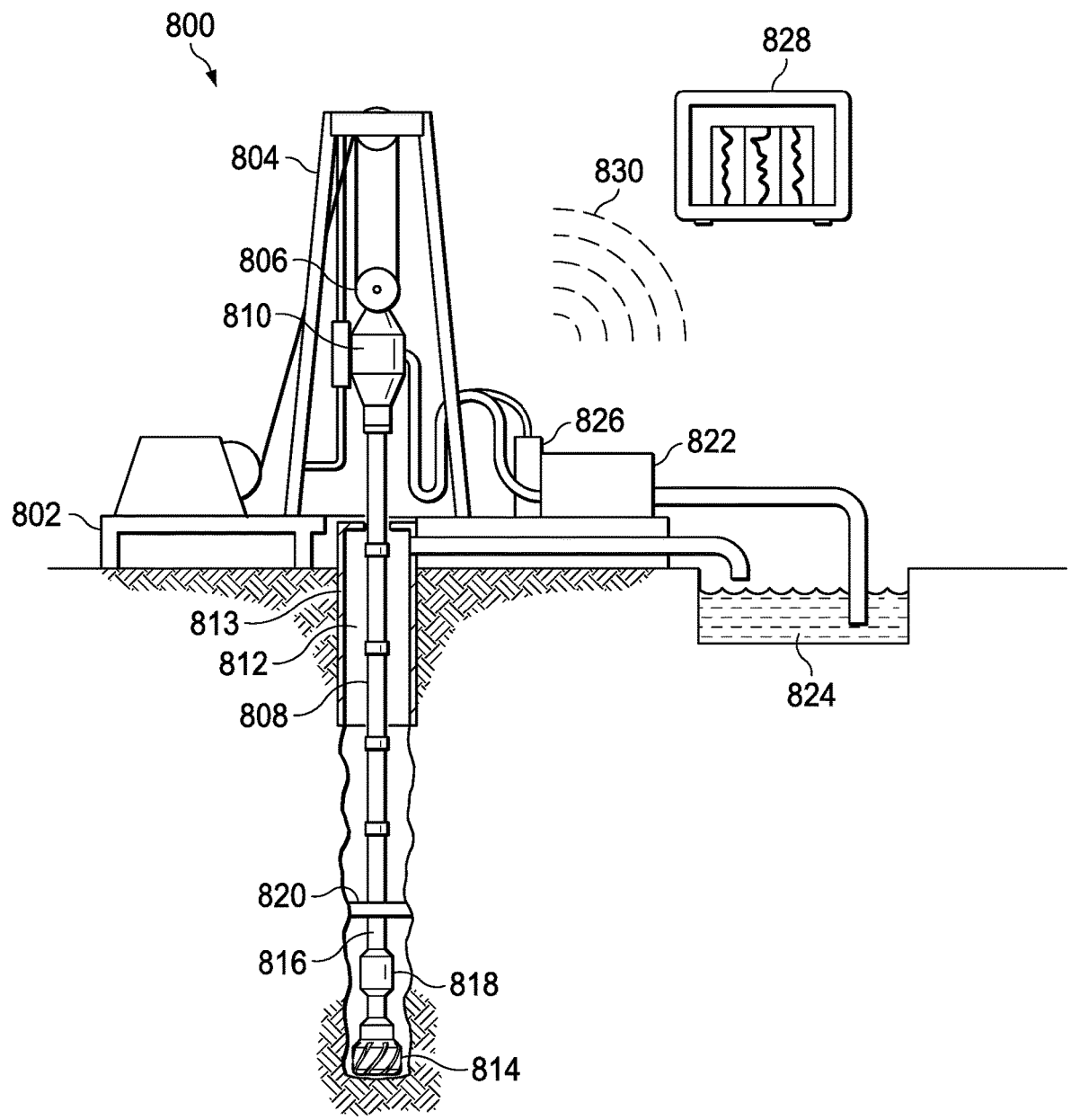
FIG. 8A is a schematic diagram of drilling equipment drilling a well.

FIGS. 8A-10 are schematic diagrams of illustrative, non-limiting oilfield operations environments in which the techniques disclosed herein may be implemented. In particular, FIG. 8A is a schematic diagram of an oil well drilling environment 800, the parameters of which may be set based on recommendations produced by a cognitive computer using the techniques disclosed herein. The drilling environment 800 comprises a drilling platform 802 that supports a derrick 804 having a traveling block 806 for raising and lowering a drill string 808. A top-drive motor 810 supports and turns the drill string 808 as it is lowered into a borehole 812. The drill string's rotation, alone or in combination with the operation of a downhole motor, drives the drill bit 814 to extend the borehole 812. The drill bit 814 is one component of a bottomhole assembly (BHA) 816 that may further include a rotary steering system (RSS) 818 and stabilizer 820 (or some other form of steering assembly) along with drill collars and logging instruments. A pump 822 circulates drilling fluid through a feed pipe to the top drive 810, downhole through the interior of drill string 808, through orifices in the drill bit 814, back to the surface via an annulus around the drill string 808, and into a retention pit 824. The drilling fluid transports formation samples—i.e., drill cuttings—from the borehole 812 into the retention pit 824 and aids in maintaining the integrity of the borehole. Formation samples may be extracted from the drilling fluid at any suitable time and location, such as from the retention pit 824. The formation samples may then be analyzed at a suitable surface-level laboratory or other facility (not specifically shown). While drilling, an upper portion of the borehole 812 may be stabilized with a casing string 813 while a lower portion of the borehole 812 remains open (uncased).

The drill collars in the BHA 816 are typically thick-walled steel pipe sections that provide weight and rigidity for the drilling process. The thick walls are convenient sites for installing logging instruments that measure downhole conditions, various drilling parameters, and characteristics of the formations penetrated by the borehole. The BHA 816 typically further includes a navigation tool having instruments for measuring tool orientation (e.g., multi-component magnetometers and accelerometers) and a control sub with a telemetry transmitter and receiver. The control sub coordinates the operation of the various logging instruments, steering mechanisms, and drilling motors, in accordance with commands received from the surface, and provides a stream of telemetry data to the surface as needed to communicate relevant measurements and status information. A corresponding telemetry receiver and transmitter is located on or near the drilling platform 802 to complete the telemetry link. At least some of the data obtained by the control sub may be stored in memory for later retrieval, e.g., when the BHA 816 physically returns to the surface.

A surface interface 826 serves as a hub for communicating via the telemetry link and for communicating with the various sensors and control mechanisms on the platform 802. A data processing unit (shown in FIG. 8A as a tablet computer 828) communicates with the surface interface 826 via a wired or wireless link 830, collecting and processing measurement data to generate logs and other visual representations of the acquired data and the derived models to facilitate analysis by a user. The data processing unit may take many suitable forms, including one or more of: an embedded processor, a desktop computer, a laptop computer, a central processing facility, and a virtual computer in the cloud. In each case, software on a non-transitory information storage medium may configure the processing unit to carry out the desired processing, modeling, and display generation. The data processing unit may also contain storage to store, e.g., data received from tools in the BHA 816 via mud pulse telemetry, EM telemetry, or any other suitable communication technique. The scope of disclosure is not limited to these particular examples of data processing units.

The drilling environment 800 contains numerous parameters that may be optimized based on the cognitive computer's recommendations. The diameter and trajectory of the borehole 812, the location of the environment 800, the particulars of the pipe and the casing 813, the particular type of fluid used, the specifics of the drilling itself (e.g., rate of penetration, revolutions per minute of the drill bit, weight on bit, pump rate, bottom hole assembly (BHA) selection, cuttings transport), wellbore strengthening opportunities, solids control, and environmental management are non-limiting examples of drilling parameters that may be optimized by executing one or more recommendations produced by the cognitive computer 702. In one illustrative application (and as described in detail with respect to FIG. 11 below), a team of engineers discussing the best way to implement the drilling environment 800 may provide some or all available details pertaining to the environment 800 to the cognitive computer 702 and request a recommendation. The cognitive computer 702 receives such information (i.e., an "oilfield operations indication") and interrogates the engineers regarding the information. The cognitive computer 702 additionally obtains oilfield operations models appropriate to the drilling environment 800 to generate multiple scenarios. The cognitive computer 702 learns about the drilling environment 800 by analyzing the scenarios (e.g., by adjusting various parameters in the oilfield operations models to determine how each such adjustment affects the outcome). The cognitive computer 702 accesses resources stored in the information repositories and, using all information collected thus far, uses its probabilistic, cognitive algorithms to generate one or more recommendations regarding the implementation of the drilling environment 800.

Figure 8B:
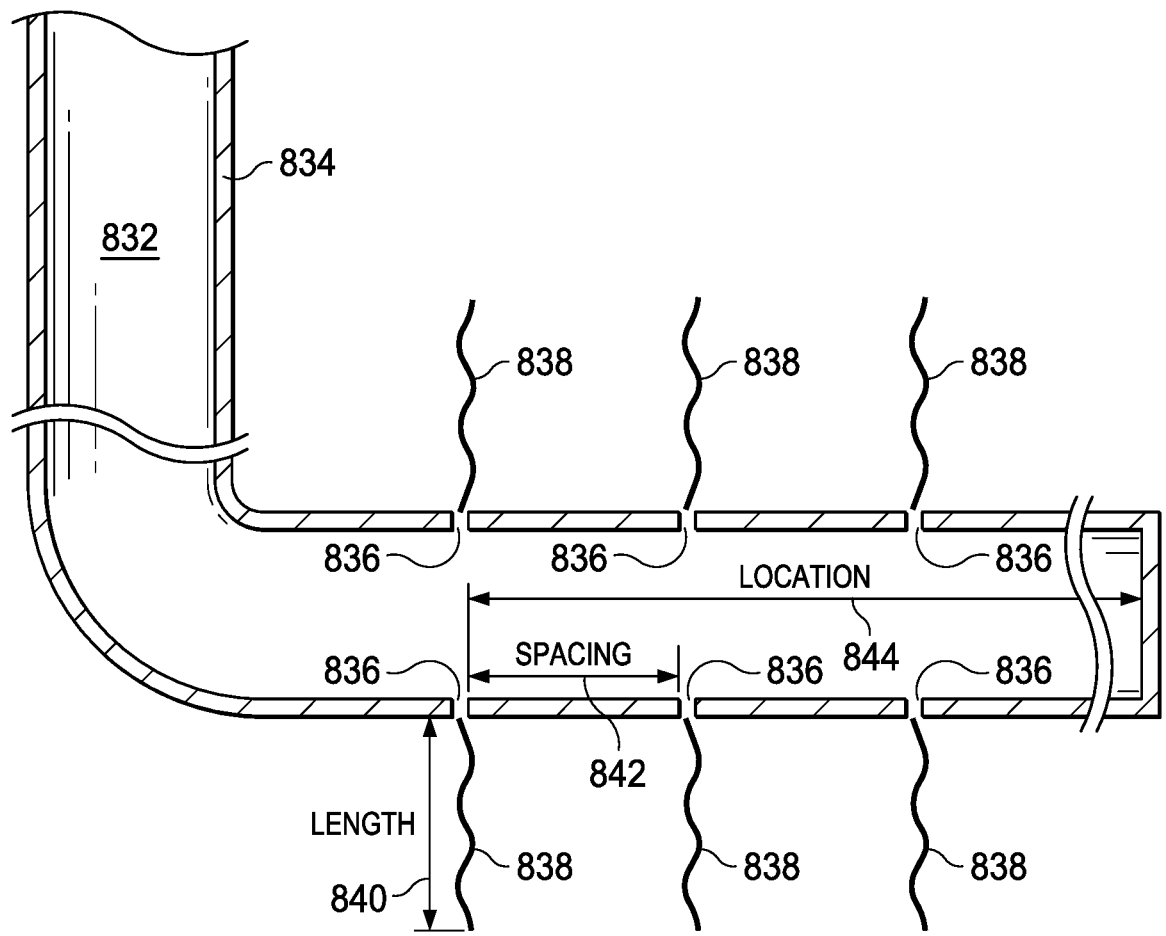
FIG. 8B is a schematic diagram of a completed well with fractures created in the formation adjacent to the well.

FIG. 8B is a schematic diagram of an illustrative, fractured borehole 832. The illustrative borehole 832 has been fully drilled, all drilling equipment has been removed, and the borehole 832 has been cased with casing 834 and cemented to sustain the structural integrity and stability of the borehole 832. The borehole 832 is formed within the earth and, more precisely, through target formation 831, which extends beyond the limited scope with which it is represented in FIG. 8B. The target formation 831 may comprise multiple layers, each layer with a different type of rock formation, including the hydrocarbon-containing target formation within which the borehole may extend horizontally for some distance. The casing 834 contains multiple perforations 836 through which a fracturing fluid, such as water, is injected with high pressure into the target formation. This high-pressure fluid injection creates and opens fractures 838 that extend laterally through the target formation. The high-pressure fluid may contain additional chemicals and materials, such as a proppant material (e.g., sand) that maintains the structural stability of the fractures and prevents the fractures from fully collapsing. Typically, the horizontal portions of the borehole are drilled generally parallel to the direction of maximum stress, causing the fractures to propagate generally perpendicular to the borehole. The overlying and underlying formation layers tend to resist fracture propagation, consequently fractures tend to propagate laterally within the target formation, to a length that depends on the rate and volume of the injected fracturing fluid. Thus each fracture has a length 840 relative to the casing 834. Each fracture also has an initiation location 844 determined by the perforation position, which is typically measured relative to the distal end of the borehole 832. Where regular spacing is employed, the perforations (and hence the fracture initiation points) have a fixed spacing 842 between them. The environment of FIG. 8B forms part of the drilling environment 800 of FIG. 8A. Accordingly, as with the drilling environment 800, the cognitive computer 702 may receive information pertaining to the environment of FIG. 8B and may generate one or more recommendations in response. Parameters that may be optimized using the cognitive computer 702 include, for example and without limitation, the locations of the fractures 838, the lengths of the fractures 838, the spacing 842 between the fractures 838, and the type of proppant used in the fractures 838.

Figure 9:
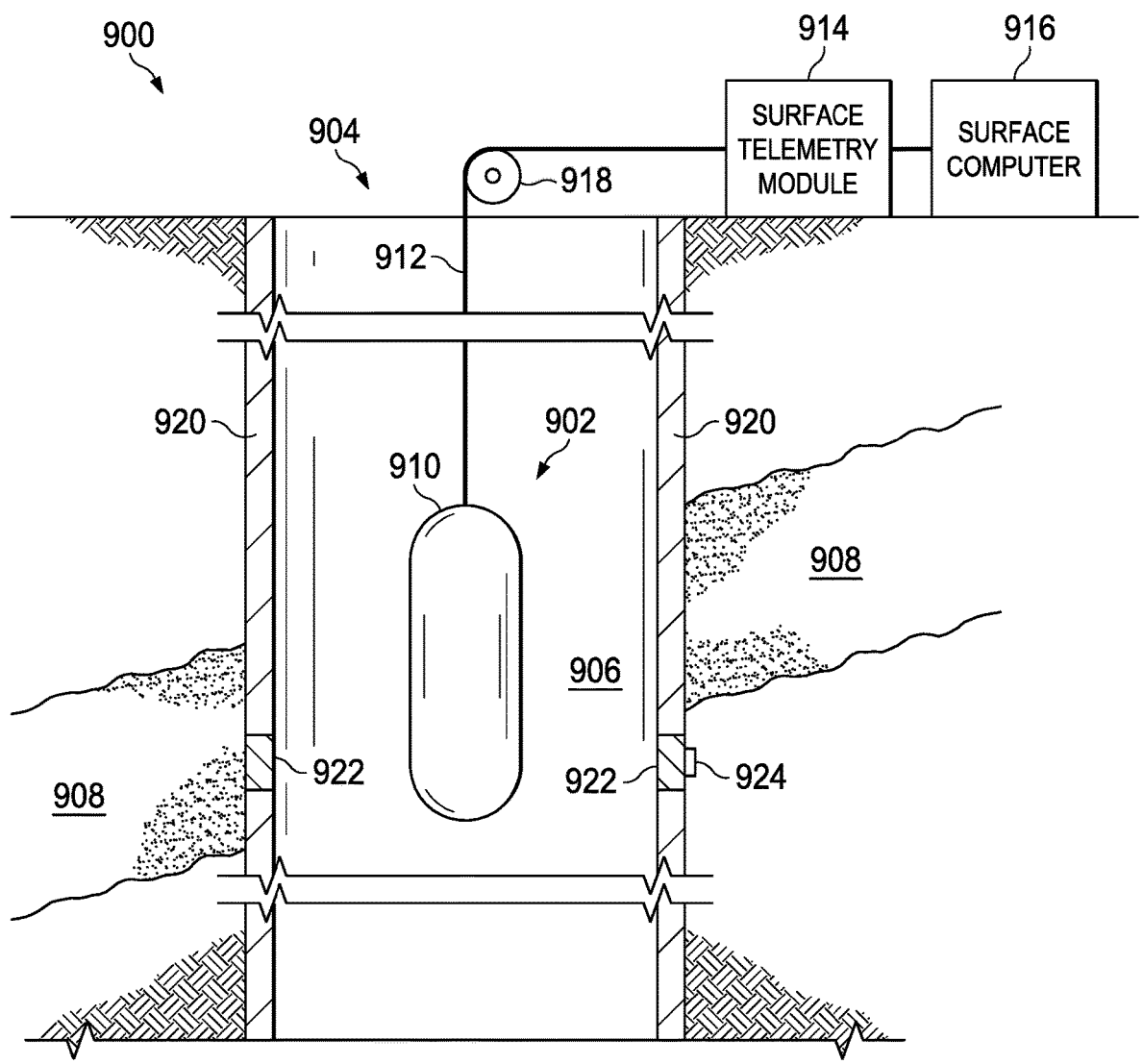
FIG. 9 is a schematic diagram of wireline equipment in a well.

FIG. 9 is a schematic diagram of an illustrative wireline environment. More specifically, FIG. 9 illustrates a logging system 900 comprising a wireline logging tool 902 disposed within a borehole 904 proximate to a formation 908 of interest. The borehole 904 contains a casing string 920 and casing fluid 906, which may comprise one or more of oil, gas, fresh water, saline water, or other substances. The tool 902 comprises a sonde 910 within which various subsystems of the tool 902 reside, and in the illustrative case of FIG. 9 the sonde 910 is suspended within the borehole 904 by a cable 912. Cable 912, in some embodiments a multi-conductor armored cable, not only provides support for the sonde 910, but also in these embodiments communicatively couples the tool 902 to a surface telemetry module 914 and a surface computer 916. The tool 902 may be raised and lowered within the borehole 904 by way of the cable 912, and the depth of the tool 902 within the borehole 904 may be determined by depth measurement system 918 (illustrated as a depth wheel). The casing string 920 may be composed of multiple segments of casing that are joined using casing collars, such as collar 922. In some embodiments, tools (e.g., electrodes, logging equipment, communication equipment including fiber optics and transmitters and/or receivers) may be included within, coupled to or adjacent to the casing string 920 and/or the collar 922. For example, FIG. 9 includes a transceiver 924 that functions as a transmitter, receiver or both and communicates with other transmitters or receivers in other parts of the borehole 904, within the sonde 910 or at the surface. As with the environments shown in FIGS. 8A and 8B, the wireline environment of FIG. 9 contains numerous parameters that may be optimized using the cognitive computer 702 and the techniques disclosed herein. For example and without limitation, the positioning of transceiver 924, the wireline logging techniques used to collect data using the sonde 910, and the processing algorithms used in the surface telemetry module 914 and/or the surface computer 916 may all be optimized using a cognitive computer 702 implementing the techniques disclosed herein.

Figure 10:
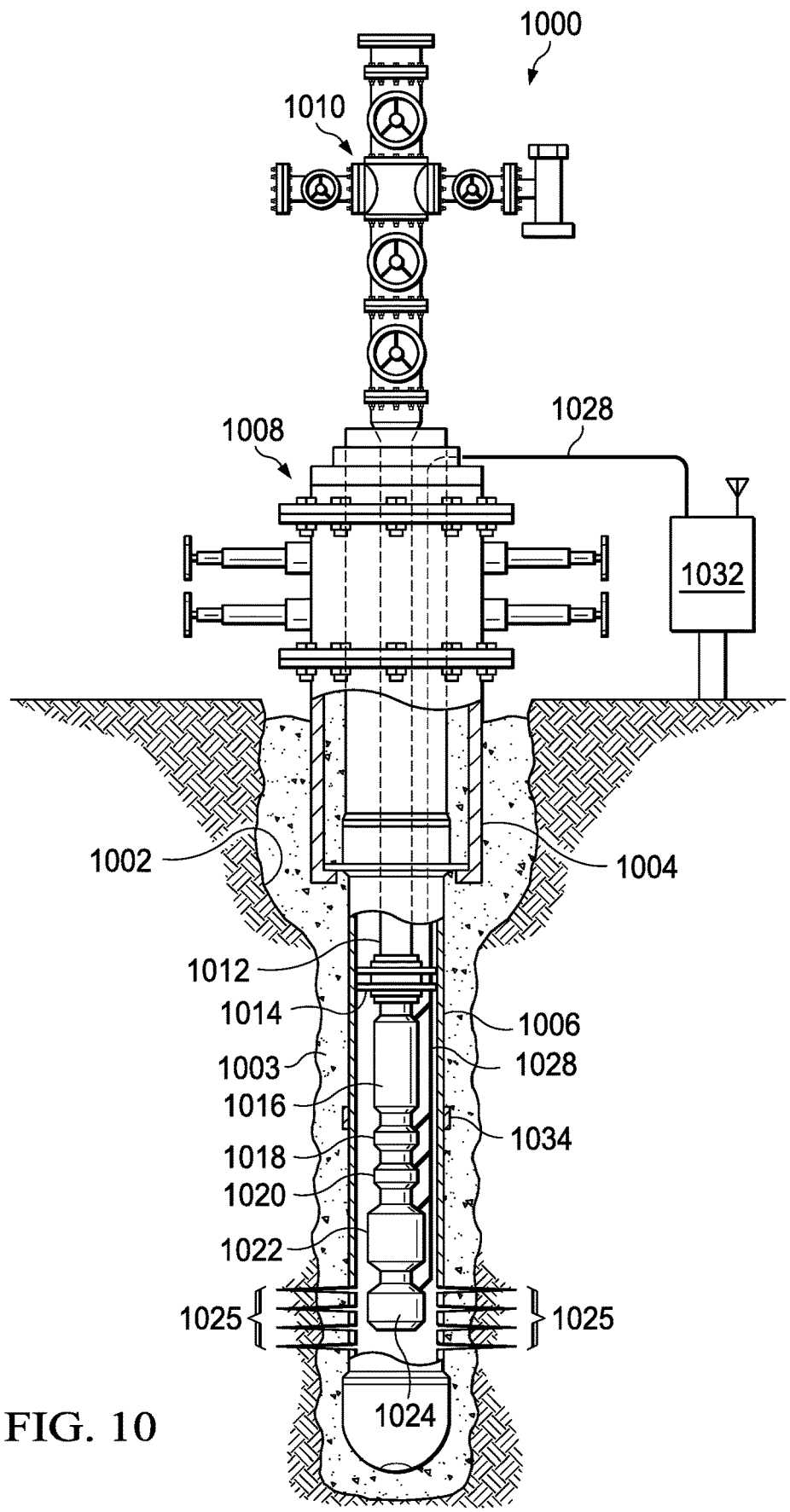
FIG. 10 is a schematic diagram of a producing well.

FIG. 10 is a schematic diagram of a producing well environment 1000 with a borehole 1002 that has been drilled into the earth. Such boreholes are routinely drilled to ten thousand feet or more in depth and can be steered horizontally for twice that distance. The producing well includes a casing header 1004 and casing 1006, both secured into place by cement 1003. Blowout preventer (BOP) 1008 couples to casing header 1004 and production wellhead 1010, which together seal in the well head and enable fluids to be extracted from the well in a safe and controlled manner.

The use of measurement devices permanently installed in the well facilitates monitoring the well. The different transducers send signals to the surface that may be stored, evaluated and used to monitor the well's operations. Such signals may be transmitted using, e.g., a transmitter 1034 that couples to or is disposed within the casing 1006 or a casing of the collar 1006. Such a transmitter may communicate with a receiver in any part of the system shown in FIG. 10, such as a receiver disposed in another part of the casing 1006, within a different casing collar, within the well, or at the surface. Measured near-wellbore measurements are periodically taken at the producing well and combined with measurements from other wells within a reservoir, enabling the overall state of the reservoir to be monitored, simulated and assessed. These measurements may be taken using a number of different downhole and surface instruments, including, but not limited to, temperature and pressure sensor 1018 and flow meter 1020. Additional devices also coupled in-line along production tubing 1012 include downhole choke 1016 (used to vary the fluid flow restriction), electric submersible pump (ESP) 1032 (which draws in fluid flowing from perforations 1025 outside ESP 1022 and production tubing 1012), ESP motor 1024 (driving ESP 1022), and packer 1014 (isolating the production zone below the packer from the rest of the well). Additional surface measurement devices may be used to measure, for example, the tubing head pressure and the electrical power consumption of ESP motor 1024.

Each of the devices along production tubing 1012 couples to cable 1028, which is attached to the exterior of production tubing 1012 and is run to the surface through blowout preventer 1008 where it couples to control panel 1032. Cable 1028 provides power to the devices to which it couples, and further provides signal paths (electrical, optical, etc.) that enable control signals to be directed from the surface to the downhole devices, and for telemetry signals to be received at the surface from the downhole devices. The devices may be controlled and monitored locally by field personnel using a user interface built into control panel 1032, or may be controlled and monitored by a computer system (not specifically shown). Communication between control panel 1032 and such a computer system may be via a wireless network (e.g., a cellular network), via a cabled network (e.g., a cabled connection to the Internet), or a combination of wireless and cabled networks. As with FIGS. 8A-9, the environment 1000 shown in FIG. 10 has various parameters that may be optimized using one or more recommendations of the cognitive computer 702. Such parameters may include, without limitation, production rate, choke operation, ESP operation, positioning of measurement devices, and positioning of transmitters and receivers.

Figure 11:
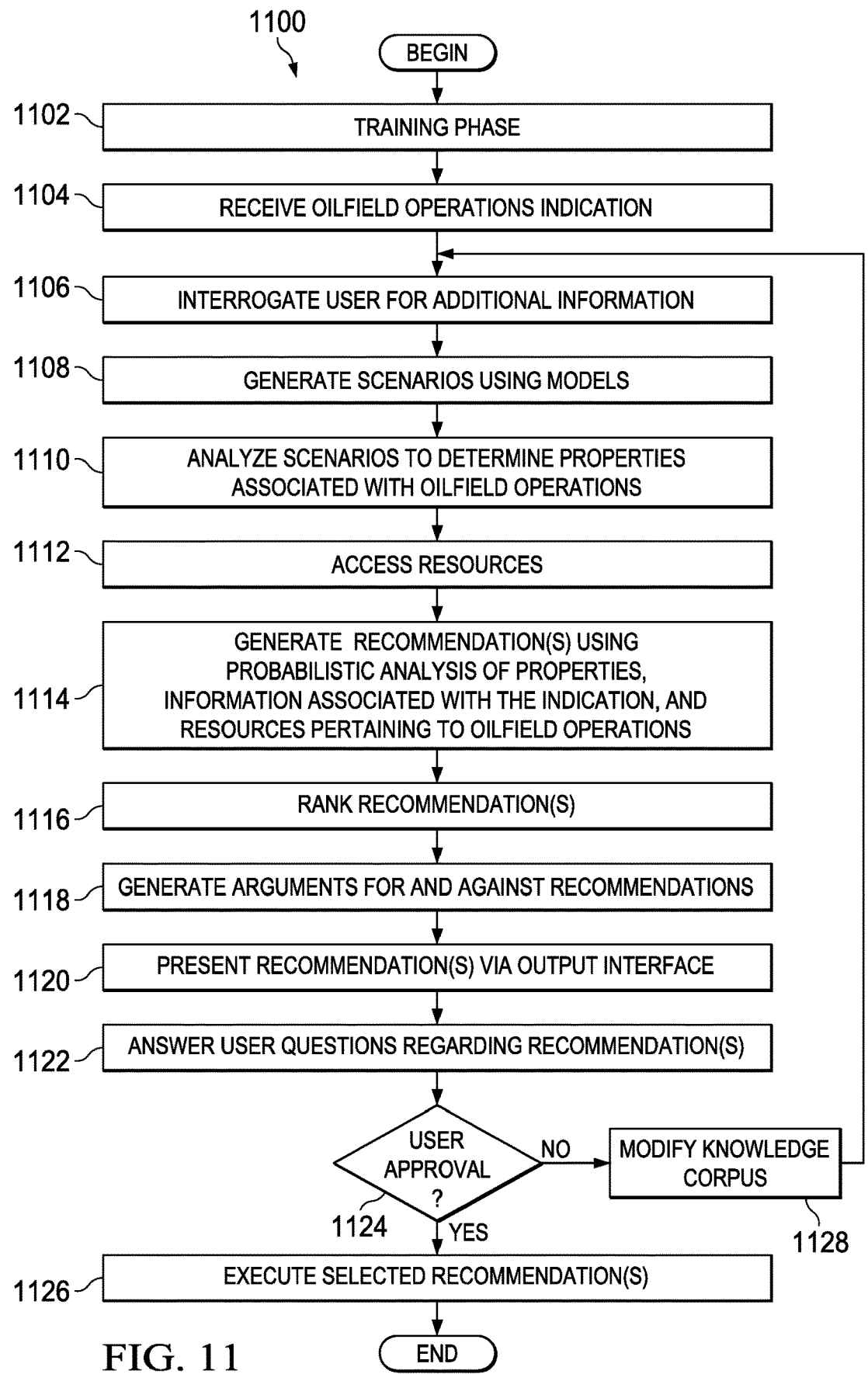
FIG. 11 is a flow diagram of a method used to enhance oilfield operations using cognitive computers.

FIG. 11 is a flow diagram of a method 1100 used to enhance oilfield operations using cognitive computers, such as the cognitive computer 702 of FIG. 7. The method 1100 begins with a training phase (step 1102) in which the cognitive computer is trained to perform a certain task—in this case, to evaluate a given oilfield operations situation and to determine one or more recommendations to enhance or optimize those oilfield operations. This is achieved by providing the cognitive computer with sufficient information so that, over time, its electronic neurons apply the appropriate weights to their various synaptic inputs so as to produce the desired axonal outputs—that is, the cognitive computer learns. Such information that results in the proper calibration of synaptic weights may include, for example, repeatedly exposing the cognitive computer to desired courses of action and optimal behavioral patterns. In the current application, such training may include, for instance, repeatedly providing the cognitive computer with a mock oilfield operations situation, requesting one or more recommendations to enhance or optimize the situation, and guiding the computer through the proper problem solving processes that it should follow to generate the recommendation(s). In general, the training phase of step 1102 requires that a user or other entity (e.g., another cognitive computer) "teach" the cognitive computer how it should behave when confronted with a problem such as the oilfield operations optimization problem described in FIG. 11.

The method 1100 then includes receiving an oilfield operations indication (step 1104). An indication is some representation of an oilfield operations situation that the cognitive computer detects in any suitable manner. For example, an indication may take the form of an explanation and a specific request for recommendations posed by a user. In some embodiments, an indication may be collected by the cognitive computer without assistance. For example, a cognitive computer equipped with a camera and a microphone may be present during an engineering meeting and may "see" and "hear" the material being presented by others at the meeting. The cognitive computer thus learns about the oilfield operations situation. Other types of indications are contemplated and fall within the scope of the disclosure. Regardless of the type of indication, an oilfield operations indication preferably includes some or all available information pertaining to the oilfield operations situation. During the illustrative engineering meeting described above, such information may be provided by, e.g., engineers at the meeting. In preferred embodiments, even seemingly irrelevant information is provided to the cognitive computer, because a relationship between the seemingly irrelevant information and the situation at hand may be apparent to a cognitive computer. Information provided to the cognitive computer may be of any nature, as the cognitive computer is capable of adapting to vague and imprecise instructions. In addition, as previously explained, oilfield operations may include, without limitation, drilling operations; completions operations; fracking operations; cementing operations; logistics operations; and production operations. Each of these categories is broad and includes any and all operations that relate to that category. For example, the drilling operations category may include, without limitation, well location planning; well placement; well trajectory; pipe selection; fluids selection; fluids clean up; environmental impact management; rate of drill bit penetration; drill bit revolutions per minute; weight on bit; fluid pump rate; bottomhole assembly selection; cuttings transportation; wellbore strengthening opportunities; and solids control.

In preferred embodiments, during step 1106 the cognitive computer engages in a conversation with the personnel to obtain clarification regarding any of the information that has been provided as part of the oilfield operations indication. For example, the cognitive computer may interrogate the user(s) or other entities to obtain additional information that may assist the computer in generating its recommendations. Personnel may provide information to and generally interact with the cognitive computer via any suitable input device, such as a microphone, a keyboard, a display, and/or a wearable device (e.g., an augmented reality device such as GOOGLE GLASS®).

The cognitive computer then accesses oilfield operations models that are stored, for example, in the information repositories 710, 712 of FIG. 7. Each such oilfield operations model is a mathematical model used for simulating, explaining and making predictions about complex physical processes and phenomena relating to oilfield operations. Models may be categorized as either deterministic or non-deterministic models, each of which is described in turn.

Deterministic models are mathematical models in which outcomes are precisely determined through known relationships among states and events, without any room for random variation. Stated another way, deterministic models always assume certainty in all inputs to the model. Accordingly, deterministic models will, given a specific set of inputs, consistently produce the same output.

One example of a deterministic model is a drilling optimization model, which describes the response of a particular drilling environment to a set of inputs or constraints. The drilling optimization model may describe how different drilling input parameters affect a single drilling output parameter, or the model may describe how such input parameters affect multiple output parameters. Such output parameters reflect the degree of drilling optimization and may include, without limitation, drill string integrity, debris removal, wellbore integrity, rate of penetration, and drilling costs. For example, a particular drilling optimization model may express the impact that input parameters such as weight on bit, drill bit revolutions per minute, tooth wear, and formation strength affect the rate of penetration. The model is thus usable to identify a particular set of these and other input parameters that produces an optimal rate of penetration. Many such drilling optimization models are well-known (e.g., Maurer; Galle and Woods; Bourgoyne and Young) and fall within the scope of disclosure.

Yet another example of a deterministic model is the vibrational model, which models drill string vibrations. Drill string vibrations typically include axial vibration ("bit bounce"), torsional vibration ("stick/slip"), and lateral vibration ("bending"). Such vibrations are caused by load or displacement excitations, such as mass imbalance, misalignment and kinks or bends, the cutting action of the drill bit, stabilizer blades, mud motors (e.g., wobbling of the rotor within the stator), and friction between the drill string and borehole wall. Vibration can be damaging; thus, vibration models are used to avoid vibration to the extent possible. Such models include frequency-based models and time-based models. The frequency-based models determine the input operating parameters that mitigate the likelihood that the drill string bottomhole assembly (BHA) will vibrate at its natural frequency, since natural frequency vibration often results in vibration. The time-based models analyze how a drilling system changes over time by accounting for formation strength and friction along the borehole. The model can be used to identify the onset of forward and backward whirl as well as lateral and torsional vibration.

Deterministic models also include torque-and-drag models. Drill string drag is the force required to move the drill string up or down inside the borehole. Torque is the force required to rotate the drill string about its axis. Excessive torque and drag can be caused by tight wellbore conditions, keyseats, differential sticking, sloughing hole, sliding wellbore friction and cuttings buildup. Torque-and-drag models help to identify the set of input parameters—such as length of horizontal sections of a well, weight to a liner-top packer, and rig equipment specifications for torque and hookload—that best mitigate excessive torque and drag.

Fracture propagation models are deterministic models that seek to describe, e.g., the shape, size and/or orientation of fractures made in rock as a result of hydraulic fracturing operations. For example, the models may describe the relationship between parameters such as pressure distribution, injection rate, fracture fluid viscosity, fracture height, and fracture width. This relationship can be used to determine any of the parameters assuming that the remaining parameters and certain physical constraints are known. For example, such models can be used to determine the dimensions of a fracture based on the pressure distribution within that fracture. The actual model used may vary depending on the assumed geometry of the fracture in question. The Perkins-Kern-Nordgren (PKN) geometry, for instance, is used when the fracture length is substantially greater than the fracture height. Assuming a PKN geometry, for example, equations may be used to calculate the pressure distribution down the fracture for any given combination of injection rate, fracture fluid viscosity, fracture height, and fracture width. Separate equations may be used to calculate the fracture width distribution given a pressure distribution, fracture height and shear modulus. Both types of equations may be used simultaneously to calculate fracture width using injection rate, fracture fluid viscosity, fracture length and formation modulus. Numerous such fracture propagation model equations are well-known to those of ordinary skill in the art.

Cementing optimization models are deterministic. The models describe the effects of changes to parameters including mud displacement, slurry properties, casing/pipe movement and centralization, fluid volumes, pump rates, and temperature and pressure differentials, with the goal of optimizing cement placement and sheath design for the life of the well. Prognostic models simulate fluid-flow interaction, displacement phenomena, and stresses in set cement to optimize designs for primary cementing, a reverse-circulation job, a balanced plug job, or a post-cementing job evaluation. Models also appraise the cumulative effect of stress to the cement sheath from events such as pressure and well testing, injection and stimulation treatments and production cycling.

Production models also are deterministic. It is expected that as a reservoir loses pressure and fluid volume, its oil production rate will decline over time. Many models exist to represent this phenomenon and to forecast the production rate. A popular model is the exponential decline model, although other types of models, such as the hyperbolic decline model, also are used. Each of these types of models includes one or more equations, known to those of ordinary skill in the art, that express the rate of production decline as a function of the maximum production rate of the well (typically when the well began production) and the current production rate of the well. In hyperbolic decline models, the rate of change of the production rate (as determined using an exponential model) may be used as well.

Well completions modeling is deterministic. Completions generally involve the selection and installation of appropriate casing, tubing, flow valves, packers, wellhead/Christmas trees, and liners. Completions may also include one or more actions, such as perforation and well stimulation. Whether some or all of the aforementioned completion components are used, or the types of such components that are used, depends on various factors. These factors include, but are not limited to: wellbore geometry; reservoir production characteristics; reservoir fluid parameters; whether the completion is open-hole, screen liner, or perforated liner; the size of the reservoir and the projected hydrocarbon production; limitations within the operation and the field (e.g., remote location of the well); projected flow rate; and desired type of reservoir monitoring. Factors influencing perforation and well stimulation activities include, without limitation: formation permeability; type of reservoir (e.g., whether the rock is susceptible to particular types of acidization); and whether fracturing is beneficial or necessary. Models describe the relationship between some or all of these factors, so that the effect of varying one or more of the factors can be determined and the factors manipulated to optimize completions.

Fluid mechanics models also are deterministic. The three primary functions of drilling fluid—to transport cuttings, to prevent fluid influx, and to maintain wellbore stability—depend on fluid flow and pressures. Accurately predicting fluid flow and pressures is thus essential to properly engineer a drilling fluid system. Models that are used to make these predictions rely on a specific set of parameters. These include, without limitation: fluid density; mass flow rate; average velocity; cross-sectional area of the flow; pressure; angle of pipe with vertical; Fanning friction factor (which, in turn, depends on fluid density, velocity, viscosity, fluid type and pipe roughness); hydraulic diameter; and length of flow increment. The models include equations that define the relationships between these parameters, and these equations may be manipulated to determine the effect that each variable has on the fluid mechanics of a given well.

Non-deterministic models, also referred to as probabilistic or stochastic models, are models used to estimate probability distributions of potential outcomes by allowing for variation in one or more inputs over time. The outputs of non-deterministic models are often presented as a list of outcomes ranked according to the probability of realization.

Geostatistical modeling is one example of a non-deterministic model. Such models integrate and use multidisciplinary data, including, without limitation: geometric descriptions of bounding surfaces, faults and internal bedding geometries; three dimensional distributions of permeability, porosity and water saturation; relative permeability and capillary pressure/saturation functions or tables; fluid pressure, volume and temperature properties; well locations; perforation intervals; production indices; production or injection rates; limiting production or injection pressures; and data from boreholes, cores, seismic lines and outcrops. Models use these and other factors to provide ranked information sets describing potential hydrocarbon properties, gross rock volume and other information that is potentially useful in, e.g., evaluating the economics of producing the reservoir and determining production facility requirements.

Logistics models may be non-deterministic. The scope of logistics in the petroleum industry is substantial and implicates any portion of the complex coordination between people, facilities and supplies to obtain and provide oil and gas. An illustrative component of logistics is supply chain management. A supply chain may include, for example, the receipt, packing, warehousing, distribution, international and domestic transportation, customs clearance, and delivery of supplies necessary for an organization to perform its duties in the oil and gas space. A logistics model describing this illustrative supply chain thus includes numerous factors, such as, without limitation: manufacturing costs (e.g., equipment cost); transportation costs (e.g., fuel cost); distribution cost (e.g., labor cost); supplier/vendor contract terms; customer satisfaction; inventory placement and movement; inventory supply and demand; optimal shipping and delivery routes, and so forth. The logistics model describes the impact that each of these and other factors has on one or more specific metrics—for example, customer satisfaction.

Genetic algorithms and kriging are not models in the traditional sense, but they are well-known techniques that may be used with non-deterministic models to refine solution sets (in the case of genetic algorithms) and/or to interpolate between values (in the case of kriging). Thus, for example, a solution set produced by a particular geostatistical model may be refined using genetic algorithms to gain additional information about the solution set and alternatives to the solution set, although this may not be possible in every instance. Similarly, although fuzzy logic is not a model or modelling technique per se, the cognitive computers described herein may be equipped to use fuzzy logic in using or interpreting ranked solution sets produced by non-deterministic models.

The cognitive computer uses the models to generate a plurality of model scenarios (step 1108). As explained above, each model scenario is generated using a different permutation of model parameters. In this way, some or preferably all possible scenarios are generated using the models, and the outcomes of each different scenario can be modeled. For instance, as explained above, torque-and-drag models help to identify the set of input parameters—such as length of horizontal sections of a well, weight to a liner-top packer, and rig equipment specifications for torque and hookload—that best mitigate excessive torque and drag. A cognitive computer performing step 1108 applies most or all potential permutations of the input parameters to determine the resulting output parameters. In this way, the computer determines how variations to the input parameters affect the output parameters.

The cognitive computer uses these scenarios and their respective modeled outcomes to learn the properties of the oilfield operations situation being analyzed (step 1110). Stated another way, the cognitive computer uses these scenarios and their respective outcomes to learn the response of the modeled oilfield operations situation to changes in the circumstances of the oilfield operations situation. In some embodiments, the cognitive computer analyzes oilfield operations models (e.g., in step 1108), and in other embodiments, the cognitive computer delegates such analysis to other machines (e.g., other cognitive computers or deterministic von Neumann computers). In still other embodiments, both the cognitive computer and another machine may share analysis duties.

The cognitive computer then accesses one or more resources stored in one or more information repositories 710, 712 (step 1112). These resources may vary widely in scope and may include, without limitation, books, journals, articles, speeches, white papers, reports, and real-time data specific to the oilfield operations situation being considered. Resources may also include knowledge bases (e.g., communications between users and/or other cognitive computers, question and answer session records, forum postings) and knowledge corpuses (e.g., all information stored locally on the cognitive computer—for example, as a local information repository). As previously explained, the resources are not necessarily stored in any particular format. Because the cognitive computer is capable of understanding material that is in "natural" language and not just language compatible with von Neumann machines, it can process, understand, and learn from all or nearly all accessible materials. The accessed resources provide the cognitive computer with additional information so that the computer is able to generate the most useful recommendations.

The method 1100 further includes the cognitive computer generating one or more recommendations based on a probabilistic analysis of its knowledge corpus—that is, the information obtained from the oilfield operations indication, information obtained by interrogating users or other entities, resources accessed from the information repositories, the properties identified during step 1110 as a result of analyzing the generated model scenarios, and any other suitable information, such as information the cognitive computer may have learned from prior experiences (step 1114). The cognitive computer will have been trained to generate such recommendations during the training phase (1102), and the specific algorithm(s) that any given cognitive computer uses to perform its probabilistic analysis may vary depending on the particular cognitive computer, the oilfield operations situation, and the cognitive computer trainers. In at least some embodiments, for example, well-known genetic algorithms may be used in tandem with the neurosynaptic artificial neural network architecture described above to generate recommendations by combining the properties obtained in step 1110 with other information (e.g., information obtained from resources in the information repositories). The genetic algorithms may be used to repeatedly generate new recommendations and the natural selection aspect of the genetic algorithms may be used to repeatedly discard all but the best of the generated recommendations. In this way, recommendations with a strong likelihood of post-execution success are generated.

In the probabilistic analysis, the cognitive computer assesses a given oilfield operations situation and its knowledge corpus to determine what outcomes are most likely when following a particular recommendation. The cognitive computer considers not just the immediate outcomes that may likely result by executing a particular recommendation, but it also considers the most likely long-term, secondary and tertiary effects that a human user would not be able to foresee. The cognitive computer may store such recommendations (along with any other relevant data) for future use, for example in the electronic synapses (FIGS. 1C, 1D) of a synaptic array (FIG. 4).

In the event that the cognitive computer identifies more than one recommendation, the cognitive computer ranks the recommendations based on a weighting algorithm (step 1116). The weighting algorithm dictates factors that are more important and those that are less important. The algorithm may have been directly programmed into the cognitive computer by a programmer, or the cognitive computer may learn the weighting algorithm during the training phase. Recommendations that have a positive impact on the most important factors may be ranked more highly than recommendations that have a positive impact on factors of lesser importance. Similarly, recommendations that have a negative impact on the most important factors may be ranked lower than recommendations that have a negative impact on factors of greater importance. The weighting algorithm is probabilistic in nature, so the rankings of the potential recommendations takes into account the most likely and least likely outcomes if each recommendation is or is not exercised (including tangential or long-term outcomes that may be difficult for personnel to foresee). This description of the weighting algorithm is merely illustrative. In practice, the particulars of the weighting algorithm(s) are programmed into the computer by a programmer, and a trainer subsequently trains the cognitive computer to use the weighting algorithms in the relevant oil and gas application(s). For example and without limitation, the trainer may train the cognitive computer to understand the relevant oil and gas application, desirable outcomes, undesirable outcomes, relevant constraints (e.g., technical, legal, financial constraints) and relevant goals, and the cognitive computer may adjust the weighting algorithm(s) accordingly. All suitable variations and permutations of such weighting algorithms are included in the scope of the disclosure.

The cognitive computer then generates—without human assistance—arguments for and against each of the recommendations (step 1118) and presents the recommendations and arguments to personnel (step 1120). Stated another way, these arguments are the "pros" and "cons" associated with each of the recommendations. The cognitive computer will have been trained to use facts to generate and support each of its arguments. For example, in recommending that a well be drilled in a specific location, the computer may list facts supporting that particular location (e.g., calculations demonstrating proper spacing from other wells, production numbers evidencing rich production history in the area) and facts that oppose drilling in that particular location (e.g., budget spreadsheet analyses describing relevant financial considerations). The cognitive computer performs thorough, probabilistic analyses (including secondary and tertiary analyses) of all potential recommendations in light of its knowledge corpus and uses these analyses in intelligently formulating its fact-based arguments.

In some embodiments, the cognitive computer engages in a conversation—using any suitable input and output interfaces—with user personnel or other entities (e.g., other cognitive computers) to discuss the ranked list of recommendations and the arguments associated with each of the recommendations (step 1122). For example, personnel may challenge the cognitive computer's arguments supporting a particular recommendation and may demand that the computer explain the assumptions it used to formulate the arguments. In response, the computer may reveal its assumptions and facts supporting those assumptions. Similarly, personnel may pose a series of questions regarding the recommendations and arguments or regarding the facts or assumptions supporting the recommendations and arguments. The cognitive computer responds to each of these without human assistance and in accordance with its training and its probabilistic algorithms. The cognitive computer's actions and outputs are not, however, restricted solely to its programming and training. Instead, as described above, the cognitive computer learns as it performs. Thus, for instance, over time the computer may learn for itself what arguments the user finds most persuasive, weaknesses in its own reasoning, which information repositories contain reliable data and which do not, and so on.

The method 1100 then includes determining whether the user approves of the one or more recommendations provided by the cognitive computer (step 1124). If so, the method 1100 comprises executing a selected recommendation(s) (step 1126). Such execution may be performed by the cognitive computer, one or more users, or by other cognitive computers. The outcomes of the executed recommendation(s)—as well as any other relevant information pertaining to the execution of the recommendation(s)—may be provided to the cognitive computer so that the information may be stored on the computer or in a suitable information repository for future reference. The process is then complete. If, however, the user disapproves of the recommendations provided (step 1124), the method 1100 includes modifying the knowledge corpus so that new recommendations are generated (step 1128). Any portion of the knowledge corpus may be modified, including and without limitation, information obtained from the information repository resources and properties determined using the modeled scenarios. Control of the method 1100 then returns to step 1106. The method 1100 may be modified in any suitable manner. Steps may be added, removed, rearranged or modified as may be suitable.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

The present disclosure encompasses numerous embodiments. At least some of these embodiments are directed to a cognitive computing system for enhancing oilfield operations, in some embodiments, comprises: neurosynaptic processing logic; and one or more information repositories accessible to the neurosynaptic processing logic, wherein the neurosynaptic processing logic produces a recommendation in response to an oilfield operations indication, the neurosynaptic processing logic produces said recommendation based on a probabilistic analysis of said oilfield operations indication, resources in the one or more information repositories, and oilfield operations models in the one or more information repositories, said oilfield operations models pertaining to oilfield operations associated with said indication, wherein the neurosynaptic processing logic presents said recommendation to a user. Such embodiments may be supplemented in a variety of ways, including by adding any of the following concepts, in any sequence and in any combination: wherein said oilfield operations models are selected from the group consisting of: drilling optimization models; vibrational models; torque-and-drag models; fracture propagation models; cementing optimization models; production models; well completions models; fluid mechanics models; geostatistical models; and logistics models; wherein each of said oilfield operations models is a mathematical model used for simulating, explaining and making predictions about physical processes and phenomena relating to oilfield operations; wherein said information repositories are selected from the group consisting of: other cognitive computing systems; databases; sources that provide real-time data pertaining to oil and gas operations; servers; personal computers; portable hard drives; thumb drives; mobile phones; smart phones; websites; and a knowledge corpus of the cognitive computing system; wherein said resources are selected from the group consisting of: real-time data specific to the oilfield operations; articles; journals; books; white papers; reports; speeches; knowledge bases; and a knowledge corpus associated with the cognitive computer; wherein said oilfield operations indication comprises a recommendation request provided by a user, an automatic determination by the neurosynaptic processing logic that a recommendation should be provided, or both; wherein the cognitive computing system interrogates said user for additional information, and wherein the cognitive computing system uses the additional information to produce said recommendation; wherein, to produce the recommendation, the neurosynaptic processing logic: identifies a plurality of oilfield operations scenarios using the oilfield operations models; and uses the scenarios to determine responses of the oilfield operations to changes in oilfield operations parameters; wherein, without human assistance, the neurosynaptic processing logic generates an argument in favor of said recommendation or against said recommendation.

At least some embodiments are directed to a cognitive computing system for enhancing oilfield operations, comprising: neurosynaptic processing logic including multiple electronic neurons operating in parallel; input and output interfaces coupled to the neurosynaptic processing logic; and one or more information repositories accessible to the neurosynaptic processing logic, wherein the neurosynaptic processing logic: receives an oilfield operations indication via the input interface; accesses oilfield operations models from the one or more information repositories to generate potential oilfield operations scenarios relating to said indication; performs a probabilistic analysis using one or more of the oilfield operations indication, the potential oilfield operations scenarios, and resources in the one or more information repositories; generates a recommendation based on said probabilistic analysis; and provides said recommendation via the output interface. Such embodiments may be supplemented in a variety of ways, including by adding any of the following concepts, in any sequence and in any combination: wherein each of said oilfield operations models is a mathematical model used for simulating, explaining and making predictions about physical processes and phenomena relating to oilfield operations; wherein the neurosynaptic processing logic automatically learns information and uses said learned information to perform said probabilistic analysis; wherein said oilfield operations are selected from the group consisting of: drilling operations; completions operations; fracking operations; cementing operations; logistics operations; and production operations; wherein said drilling operations are selected from the group consisting of: well location planning; well placement; well trajectory; pipe selection; fluids selection; fluids clean up; environmental impact management; rate of drill bit penetration; drill bit revolutions per minute; weight on bit; fluid pump rate; bottomhole assembly selection; cuttings transportation; wellbore strengthening opportunities; and solids control; wherein, after the neurosynaptic processing logic provides said recommendation, the cognitive computing system engages in a conversation with a user about the recommendation; wherein the cognitive computing system executes the recommendation if a user approves the recommendation.

At least some embodiments are directed to a method for enhancing oilfield operations, comprising: receiving, at a cognitive computer, an oilfield operations indication; generating scenarios relating to said indication using oilfield operations models, said models pertain to oilfield operations associated with said indication; analyzing the scenarios to determine properties associated with said oilfield operations; generating a recommendation based on said properties and resources pertaining to the oilfield operations; and presenting said recommendation using an output interface associated with the cognitive computer. Such embodiments may be supplemented in a variety of ways, including by adding any of the following concepts, in any sequence and in any combination: wherein said properties describe responses of the oilfield operations to changes in oilfield operations parameters; further comprising the cognitive computer engaging in a conversation about the recommendation with a user; wherein generating said recommendation comprises using one or more genetic algorithms.

The invention claimed is:

1. A cognitive computing system for enhancing oilfield operations, comprising:
   neurosynaptic processing logic; and
   one or more information repositories accessible to the neurosynaptic processing logic,
   wherein the neurosynaptic processing logic produces a ranked list of one or more recommendations and arguments associated with each of the one or more recommendations in response to an oilfield operations indication, said ranked list of one or more recommendations and the arguments associated with each of the one or more recommendations based on a probabilistic analysis of said oilfield operations indication, resources in the one or more information repositories, and oilfield operations models in the one or more information repositories, said oilfield operations models pertaining to oilfield operations associated with said indication, the arguments including a list of facts supporting and opposing each of the one or more recommendations, and the arguments being based on information associated with the one or more information repositories, the cognitive computing system's probabilistic algorithms, and prior experiences,
   wherein the neurosynaptic processing logic, to produce the ranked list of one or more recommendations and the arguments associated with each of the one or more recommendations, identifies a plurality of oilfield operations scenarios using the oilfield operations models; and uses the scenarios to determine responses of the oilfield operations to changes in oilfield operations parameters,
   wherein the neurosynaptic processing logic presents said ranked list of one or more recommendations and the arguments associated with each of the one or more recommendations to a user via an output interface; and
   wherein the cognitive computing system engages in a conversation about said ranked list of one or more recommendations and the arguments associated with each of the one or more recommendations with said user by asking questions, receiving and processing answers, answering said user's questions, and asking follow-up questions about said ranked list of one or more recommendations and the arguments associated with each of the one or more recommendations.

2. The cognitive computing system of claim 1, wherein said oilfield operations models are selected from a group consisting of: drilling optimization models; vibrational models; torque-and-drag models; fracture propagation models; cementing optimization models; production models; well completions models; fluid mechanics models; geostatistical models; and logistics models.

3. The cognitive computing system of claim 1, wherein each of said oilfield operations models is a mathematical model used for simulating, explaining and making predictions about physical processes and phenomena relating to oilfield operations.

4. The cognitive computing system of claim 1, wherein said information repositories are selected from a group consisting of: other cognitive computing systems; databases; sources that provide real-time data pertaining to oil and gas operations; servers; personal computers; portable hard drives; thumb drives; mobile phones; smart phones; websites; and a knowledge corpus of the cognitive computing system.

5. The cognitive computing system of claim 1, wherein said resources are selected from a group consisting of: real-time data specific to the oilfield operations; articles; journals; books; white papers; reports; speeches; knowledge bases; and a knowledge corpus associated with the cognitive computing system.

6. The cognitive computing system of claim 1, wherein said oilfield operations indication comprises a recommendation request provided by said user, an automatic determination by the neurosynaptic processing logic that a recommendation should be provided, or both.

7. The cognitive computing system of claim 1, wherein, without human assistance, the neurosynaptic processing logic generates an argument in favor of said one or more recommendations or against said one or more recommendations.

8. A cognitive computing system for enhancing oilfield operations, comprising:
   neurosynaptic processing logic including multiple electronic neurons operating in parallel;
   input and output interfaces coupled to the neurosynaptic processing logic; and
   one or more information repositories accessible to the neurosynaptic processing logic,
   wherein the neurosynaptic processing logic:
     receives an oilfield operations indication via the input interface;
     accesses oilfield operations models from the one or more information repositories to generate potential oilfield operations scenarios relating to said indication;
     performs a probabilistic analysis using one or more of the oilfield operations indication, the potential oilfield operations scenarios, and resources in the one or more information repositories;
     identifies a plurality of oilfield operations scenarios using the oilfield operations models;
     uses the scenarios to determine responses of the oilfield operations to changes in oilfield operations parameters;
     generates a ranked list of one or more recommendations and arguments associated with each of the one or more recommendations based on said probabilistic analysis, the arguments including a list of facts supporting and opposing each of the one or more recommendations, and the arguments being based on information associated with the one or more information repositories, the cognitive computing system's probabilistic algorithms, and prior experiences;
     provides said ranked list of one or more recommendations and the arguments associated with each of the one or more recommendations via the output interface; and
     engages in a conversation about said ranked list of one or more recommendations and the arguments associated with each of the one or more recommendations with a user by asking questions, receiving and processing answers, answering said user's questions, and asking follow-up questions about said ranked list of one or more recommendations and the arguments associated with each of the one or more recommendations.

9. The cognitive computing system of claim 8, wherein each of said oilfield operations models is a mathematical model used for simulating, explaining and making predictions about physical processes and phenomena relating to oilfield operations.

10. The cognitive computing system of claim 8, wherein the neurosynaptic processing logic automatically learns information and uses said learned information to perform said probabilistic analysis.

11. The cognitive computing system of claim 8, wherein said oilfield operations are selected from a group consisting of: drilling operations; completions operations; fracking operations; cementing operations; logistics operations; and production operations.

12. The cognitive computing system of claim 11, wherein said drilling operations are selected from a group consisting of: well location planning; well placement; well trajectory; pipe selection; fluids selection; fluids clean up; environmental impact management; rate of drill bit penetration; drill bit revolutions per minute; weight on bit; fluid pump rate; bottomhole assembly selection; cuttings transportation; wellbore strengthening opportunities; and solids control.

13. The cognitive computing system of claim 8, wherein the cognitive computing system executes the one or more recommendations if said user approves the one or more recommendations.

14. A method for enhancing oilfield operations, comprising:
receiving, at a cognitive computing system, an oilfield operations indication;
generating a plurality of oilfield operations scenarios relating to said indication using oilfield operations models, said models pertain to oilfield operations associated with said indication;
analyzing the scenarios to determine properties associated with said oilfield operations including responses of the oilfield operations to changes in oilfield operations parameters;
generating a ranked list of one or more recommendations and arguments associated with each of the one or more recommendations based on said properties and based on resources pertaining to the oilfield operations, the arguments including a list of facts supporting and opposing each of the one or more recommendations, and the arguments being based on information associated with the one or more information repositories, the cognitive computing system's probabilistic algorithms, and prior experiences;
presenting said ranked list of one or more recommendations and the arguments associated with each of the one or more recommendations using an output interface associated with the cognitive computing system; and
engaging in a conversation about said ranked list of one or more recommendations and the arguments associated with each of the one or more recommendations with a use by asking questions, receiving and processing answers, answering said user's questions, and asking follow-up questions about said ranked list of one or more recommendations and the arguments associated with each of the one or more recommendations.

15. The method of claim 14, wherein generating said ranked list of one or more recommendations and the arguments associated with each of the one or more recommendations comprises using one or more genetic algorithms.

* * * * *